United States Patent
Henzen et al.

(10) Patent No.: US 12,039,951 B2
(45) Date of Patent: *Jul. 16, 2024

(54) SPREAD-SPECTRUM VIDEO TRANSPORT INTEGRATION WITH DISPLAY DRIVERS

(71) Applicant: HYPHY USA Inc., San Jose, CA (US)

(72) Inventors: Alex Henzen, NM Bladel (NL); Todd Rockoff, Holgate (AU)

(73) Assignee: HYPHY USA INC., San Jose, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/900,570

(22) Filed: Aug. 31, 2022

(65) Prior Publication Data

US 2023/0071881 A1    Mar. 9, 2023

Related U.S. Application Data

(60) Provisional application No. 63/346,064, filed on May 26, 2022, provisional application No. 63/317,336, (Continued)

(51) Int. Cl.
G09G 3/20    (2006.01)
G06T 9/00    (2006.01)
G09G 3/36    (2006.01)

(52) U.S. Cl.
CPC ......... *G09G 3/3685* (2013.01); *G09G 3/2096* (2013.01); *G09G 3/3674* (2013.01); (Continued)

(58) Field of Classification Search
CPC .. G09G 3/20; G09G 3/22; G09G 3/30; G09G 3/32; G09G 3/34; G09G 3/36; (Continued)

(56) References Cited

U.S. PATENT DOCUMENTS 3,204,035 A    8/1965 Ballard et al.
3,795,765 A    3/1974 DeGroat et al.
(Continued)

FOREIGN PATENT DOCUMENTS

CN    101933277    12/2010
CN    101969319    2/2011
(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.

(Continued)

*Primary Examiner* — Chanh D Nguyen
*Assistant Examiner* — Nguyen H Truong
(74) *Attorney, Agent, or Firm* — Beyer Law Group LLP

(57) ABSTRACT

A video display includes a display panel with gate drivers and source drivers. Each of said the source drivers is arranged to receive a discrete-time continuous-amplitude signal representing a video stream over a transmission medium and to decode the signal using demodulation to produce a plurality of samples for output on outputs of the source drivers. At least one of the source drivers is arranged to extract a gate driver timing control signal from the signal and to output the gate driver control signal to the gate drivers in order to synchronize the gate drivers with outputs of the source drives, whereby the video stream is displayed on the display panel of the display unit.

33 Claims, 19 Drawing Sheets

Related U.S. Application Data filed on Mar. 7, 2022, provisional application No. 63/280,017, filed on Nov. 16, 2021, provisional application No. 63/240,630, filed on Sep. 3, 2021.

(52) U.S. Cl.
CPC ............... *G09G 2310/0289* (2013.01); *G09G 2310/0291* (2013.01); *G09G 2310/0294* (2013.01); *G09G 2330/021* (2013.01); *G09G 2360/08* (2013.01)

(58) Field of Classification Search
CPC .. G09G 3/3233; G09G 3/3275; G09G 3/3266; G09G 3/3685; G09G 3/2096; G09G 3/3674; G09G 2310/0291; G09G 2310/0294; G09G 2330/021; G09G 2360/08; G09G 5/00; G09G 5/02; G09G 5/04; G09G 5/10; G09G 5/18; G08B 21/02; H03M 9/00; G06F 3/038; G06F 1/04; G06F 1/08; G06F 1/10; G06F 13/00; G06F 15/16; G02F 1/133; G02F 1/1335; H03K 3/017; H03K 3/027; H03K 3/84; H04N 3/14; H04N 5/08; H04N 5/44; H04N 5/445; H04N 7/10; H04N 7/20; H04N 7/18; H04N 7/26; H04N 9/31; H04N 13/00; H04N 13/02; H04N 17/00; H04N 17/02; H04N 19/42; H04N 19/44

See application file for complete search history.

(56) References Cited

U.S. PATENT DOCUMENTS

| | | | |
|---|---|---|---|
| 5,793,759 A | 8/1998 | Rakib et al. | |
| 5,796,774 A | 8/1998 | Kato | |
| 5,870,414 A | 2/1999 | Chaib et al. | |
| 5,936,997 A | 8/1999 | Kanda | |
| 5,938,787 A | 8/1999 | Stark et al. | |
| 5,956,333 A | 9/1999 | Zhou et al. | |
| 5,966,376 A | 10/1999 | Rakib et al. | |
| 6,018,547 A | 1/2000 | Arkhipkin | |
| 6,128,309 A | 10/2000 | Tariki et al. | |
| 6,154,456 A | 11/2000 | Rakib et al. | |
| 6,289,039 B1 | 9/2001 | Garodnick | |
| 6,310,923 B1 | 10/2001 | Lee et al. | |
| 6,456,607 B2 | 9/2002 | Arai et al. | |
| 6,480,559 B1 | 11/2002 | Dabak et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,710,910 B2 | 5/2010 | Ode et al. | |
| 7,793,022 B2 | 9/2010 | Travers et al. | |
| 7,796,575 B2 | 9/2010 | Lim et al. | |
| 7,873,097 B1 | 1/2011 | Luecke et al. | |
| 7,873,980 B2 | 1/2011 | Horan et al. | |
| 7,908,634 B2 | 3/2011 | Keady et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 | 12/2018 | Hannebauer et al. | |
| 10,763,914 B2 | 9/2020 | Hannebauer et al. | |
| 11,025,292 B2 | 6/2021 | Hannebauer et al. | |
| 11,394,422 B2 | 7/2022 | Hannebauer et al. | |
| 11,463,125 B2 | 10/2022 | Hannebauer et al. | |
| 11,716,114 B2 | 8/2023 | Hannebauer | |
| 2002/0013926 A1 | 1/2002 | Kim et al. | |
| 2002/0097779 A1 | 7/2002 | Bang et al. | |
| 2002/0154620 A1 | 10/2002 | Azenkot et al. | |
| 2003/0139178 A1 | 7/2003 | Uesugi et al. | |
| 2004/0120415 A1 | 6/2004 | Song et al. | |
| 2005/0069020 A1 | 3/2005 | Lakkis | |
| 2007/0016931 A1* | 1/2007 | Ichioka | H04N 5/445 725/39 |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0091990 A1 | 4/2010 | Etemad et al. | |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2011/0169870 A1* | 7/2011 | Yang | G09G 3/3688 345/212 |
| 2012/0014464 A1 | 1/2012 | Eiger et al. | |
| 2012/0047229 A1* | 2/2012 | Bennett | H04N 21/2665 709/217 |
| 2013/0194284 A1 | 8/2013 | Bi | |
| 2014/0218616 A1 | 8/2014 | Toba et al. | |
| 2014/0340431 A1* | 11/2014 | Yamakawa | G09G 3/2003 345/690 |
| 2015/0014712 A1 | 1/2015 | Kim et al. | |
| 2015/0154943 A1 | 6/2015 | Lee et al. | |
| 2016/0127087 A1 | 5/2016 | Feher | |
| 2016/0163277 A1 | 6/2016 | Ludden et al. | |
| 2018/0357969 A1* | 12/2018 | Chang | G09G 5/003 |
| 2019/0174027 A1 | 6/2019 | Lv et al. | |
| 2019/0230373 A1* | 7/2019 | Kurokawa | H04N 19/44 |
| 2019/0260629 A1 | 8/2019 | Nikopour et al. | |
| 2019/0342564 A1* | 11/2019 | Kurokawa | H03K 3/3562 |
| 2020/0043440 A1* | 2/2020 | Qiu | G06F 30/30 |
| 2020/0320940 A1* | 10/2020 | Lee | G02F 1/133602 |
| 2020/0388237 A1 | 12/2020 | Tu et al. | |
| 2022/0302953 A1 | 9/2022 | Hannebauer et al. | |
| 2022/0397931 A1* | 12/2022 | Song | G06F 3/14 |
| 2023/0223981 A1 | 7/2023 | Hannebauer | |
| 2023/0230559 A1 | 7/2023 | Friedman | |
| 2023/0343304 A1 | 10/2023 | Henzen et al. | |

FOREIGN PATENT DOCUMENTS

| | | |
|---|---|---|
| CN | 101917209 | 7/2015 |
| EP | 0 727 881 | 8/1996 |
| EP | 1 079 536 | 2/2001 |
| EP | 1 968 324 | 9/2008 |
| JP | 08293818 | 11/1996 |
| JP | H09312590 | 12/1997 |
| JP | 2001-144653 | 5/2001 |
| JP | 2001510658 | 7/2001 |
| JP | 2007-150971 | 6/2007 |
| WO | WO 97/02663 | 1/1997 |
| WO | WO 98/52365 | 11/1998 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE

(56) References Cited

OTHER PUBLICATIONS transactions on Power Delivery, vol. 20, No. 1, Jan. 2005.
Immink, "Construction of DC-free Codes Using the fast Hadamard Transform", Nov. 7, 2001, 6 pages.

* cited by examiner

Convert Digital to Analog at Source Drivers

SSVT Source Drivers

SPREAD-SPECTRUM VIDEO TRANSPORT INTEGRATION WITH DISPLAY DRIVERS

CROSS-REFERENCE TO RELATED APPLICATIONS

This application claim priority of U.S. provisional patent application No. 63/240,630, filed Sep. 3, 2021, No. 63/280,017, filed on Nov. 16, 2021, No. 63/317,336, filed on Mar. 7, 2022, and No. 63/346,064, filed on May 26, 2022, all of which are hereby incorporated by reference.

This application also incorporates by reference U.S. application Ser. No. 15/925,123, filed on Mar. 19, 2018, U.S. application Ser. No. 16/494,901 filed on Sep. 17, 2019, U.S. application Ser. No. 17/879,499 filed on Aug. 2, 2022, U.S. application Ser. No. 17/686,790, filed on Mar. 4, 2022, U.S. application Ser. No. 17/887,849 filed on Aug. 15, 2022, U.S. application Ser. No. 17/851,821, filed on Jun. 28, 2022, U.S. application No. 63/398,460 filed on Aug. 16, 2022, and U.S. application No. 63/391,226, filed on Jul. 21, 2022.

FIELD OF THE INVENTION

The present invention relates generally to displaying video on a display panel of a display unit. More specifically, the present invention relates to a source driver that decodes an analog signal for display.

BACKGROUND OF THE INVENTION

Image sensors, display panels, and video processors are continually racing to achieve larger formats, greater color depth, higher frame rates, and higher resolutions. Local-site video transport includes performance-scaling bottlenecks that throttle throughput and compromise performance while consuming ever more cost and power. Eliminating these bottlenecks can provide advantages.

For instance, with increasing display resolution, the data rate of video information transferred from the video source to the display screen is increasing exponentially: from 3 Gbps a decade ago for full HD, to 160 Gbps for new 8K screens. Typically, a display having a 4K display resolution requires about 18 Gbps of bandwidth at 60 Hz while at 120 Hz 36 Gbps are needed. And, an 8K display requires 72 Gbps at 60 Hz and 144 Gbps at 120 Hz.

Until now, the data is transferred digitally using variants of low-voltage differential signaling (LVDS) data transfer, using bit rates of 16 Gbps per signal pair, and parallelizing the pairs to achieve the required total bit rate. With a wiring delay of 5 ns/m, the wavelength of every bit on the digital connection is 12 mm, which is close to the limit of this type of connection and requires extensive data synchronization to obtain useable data. This digital information then needs to be converted to the analog pixel information on the fly using ultra-fast digital-to-analog (D/A) conversion at the source drivers of the display.

Nowadays, D-to-A converters use 8 bits; soon, D-to-A conversion may need 10 or even 12 bits and then it will become very difficult to convert accurately at a fast enough data rate. Thus, displays must do the D-to-A conversion in a very short amount of time, and, the time being available for the conversion is also becoming shorter, resulting in stabilization of the D-to-A conversion also being an issue.

Accordingly, new apparatuses and techniques are desirable to eliminate the need for D-to-A conversion at a source driver of a display, to increase bandwidth, and to utilize an analog video signal generated outside of a display unit or within it.

SUMMARY OF THE INVENTION

To achieve the foregoing, and in accordance with the purpose of the present invention, a source driver of a display panel in a display unit is disclosed that decodes an analog signal into voltages expected by the display panel.

A video signal is a list of brightness values. It is realized that precisely maintaining fixed-bit-width (i.e., digital) brightness values is inefficient for video transport, and because there is no requirement for bit-accurate reproduction of these brightness values, analog voltages offer much greater dynamic range. Therefore, the present invention proposes to transport display panel video signals as analog signals rather than digital signals.

Advantages include reducing power consumption. In the prior art, power consumption significantly constrains system performance; using the present invention, up to 60% less power is consumed. Further, embodiments provide noise immunity and EM stealth in that EMI/RFI emissions of a display panel will be well below mandated limits. Yet further, the transmission reach of the novel analog signal is much greater than that of conventional Ethernet or HDBaseT signals. And, whereas conventional transport uses expensive, mixed-signal processes for high-speed digital circuits, embodiments of the present invention make use of fully depreciated analog processes for greater flexibility and lower production cost.

Further, use of the novel analog spread-spectrum video transport (SSVT) signal for data transfer between a display controller and source drivers of a display panel dramatically reduces the cost of the silicon chip and its complexity. For example, for 4K 60 Hz panels and for 8K 120 Hz panels there is a 3:1 chip area savings and a 10:1 chip area savings, respectively, when comparing traditional transport between a signal source (via LVDS or Vx1 transmitter) and a source driver receiver (with D-to-A converters) to the equivalent functionality implemented using transport between a novel SSVT transmitter and novel SSVT receiver.

The present invention is directed to circuits for decoding analog video data that is transmitted between a video source and a video sink using techniques that borrow from spread spectrum direct sequence (SSDS) modulation-based Code Division Multiple Access (CDMA) channel sharing. As described in more detail below, the number and content of input video samples received from the video source depends on the color space in operation at the source. Regardless of which color space is used, each video sample is representative of a sensed or measured amount of light in the designated color space.

As a stream of input digital video samples is received at an encoder, the input digital video samples are repeatedly (1) distributed by assigning the input video samples into encoder input vectors according to a predetermined permutation and (2) encoded by applying an SSDS-based modulation to each of the multiple encoder input vectors, applying orthogonal codes, to generate multiple composite EM signals with noise-like properties. The analog EM signals are than transmitted (3) over a transmission medium. On the receive side, (4) the incoming analog EM signals are decoded by applying an SSDS-based demodulation, using the same orthogonal codes, in order to reconstruct the samples into output vectors and then (5) the output vectors are presented as voltages to the display. As a result, the original stream of time-ordered video samples containing color and pixel related information is conveyed from video source to video sink.

Once captured at a video source and converted, digital video data can be encoded and transmitted to a video display for near real-time viewing. The captured video data can also be stored for later viewing in a time-shifted mode. In either case, an analog SSVT signal is used to transmit the digital video data received from the video source (or storage device) to a video sink for display (or storage). The SSVT signal may originate at a computer or other processor and be delivered to a display unit (video sink), thus originating outside of the display unit, or the SSVT signal may be generated within the display unit or display panel itself.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
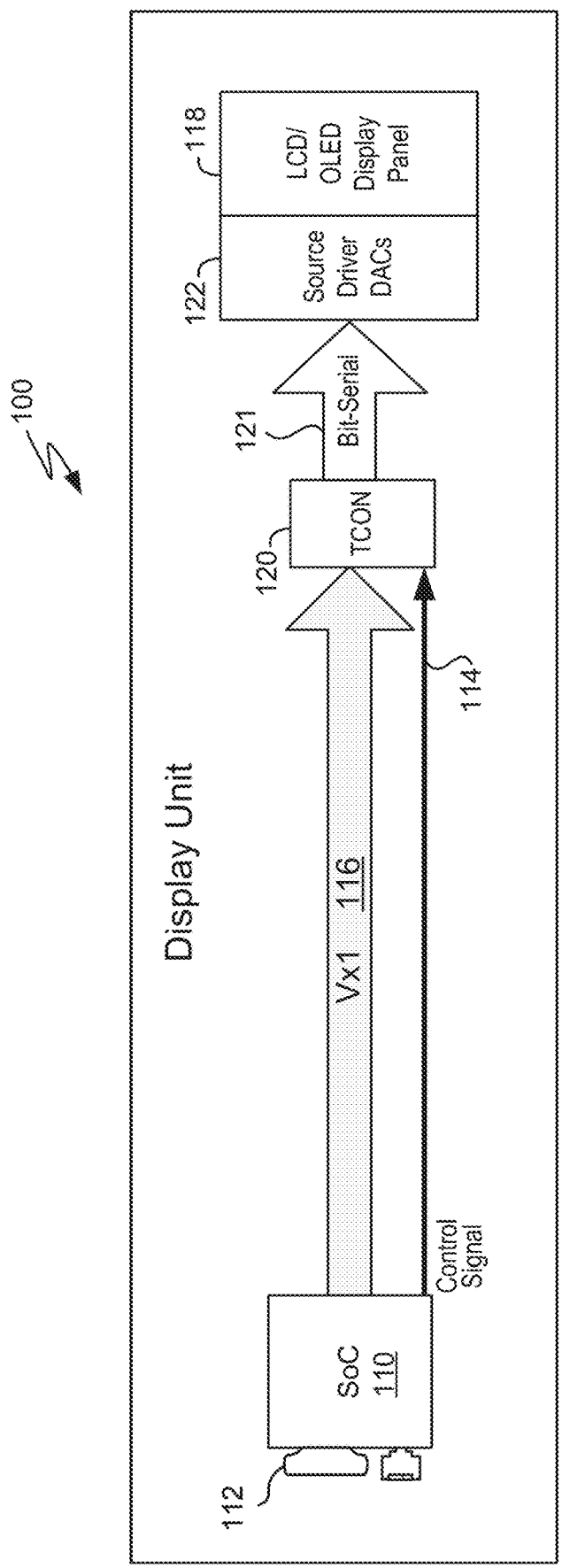
FIG. 1 illustrates a prior art delivery of a digital signal to a display panel within a display unit.

In video display systems the transformation of the incident light into a signal is generally performed by a source assembly and a predetermined transformation will determine the format of the payload that is to be transported from the source assembly, over one or more electromagnetic pathways, to a sink assembly, which may be a display or a video processor, which receives the predetermined format and transforms the received payload into a signal used with a suitable output device for creating radiated light suitable for viewing by humans.

It is realized that digitization of a video signal takes place at the signal source of the system (often at a GPU) and then the digital signal is transferred, usually using a combination of high performance wiring systems, to the display source drivers, where the digital signal is returned to an analog signal again, to be loaded onto the display pixels. So, the only purpose of the digitization is data transfer from video source to display pixel. Therefore, we realize that it is much more beneficial to avoid digitization altogether (to the extent possible), and to directly transfer the analog data from video source to the display drivers. This can be done using our novel SSVT encoding, leading to accurate analog voltages to be decoded again in the source drivers. The analog data has high accuracy, so there is no need for high bit depth. This means the sample rate is at least a factor of ten lower than in the case of digital transfer, leaving further bandwidth for expansion.

Further it is recognized that it is much easier to perform the D-to-A conversion at the point where less power is needed than at the end point where you actually have to drive the display panel. Thus, instead of transporting a digital signal from the video source all the way to the location where the analog signal needs to be generated, we transport the analog signal to the display over a very much lower sample rate than one would normally have with digitization. That means that instead of having to send Gigabits per second over a number of lines, we can now do with only a few mega samples per second in case of the analog signal, thus reducing the bandwidth of the channel that has to be used. Further, with prior art digital transport, every bit will occupy just about 1.25 cm (considering that propagation in cable is approximately 0.2 m/ns, 16 Gbps means 1/16 ns/bit, so one bit is 0.2/16 meter), whereas transporting analog data results in an increase of tenfold amount of space available, meaning extra bandwidth available.

And further, a bit in digital data must be well defined. This definition is fairly sensitive to errors and noise, and one needs to be able to detect the high point and the low point very accurately. Whereas, the proposed analog transport is much less sensitive. That means that the quality of the cable (e.g., going from one side to the other in a display) does not need to be high.

The invention is especially applicable to high resolution, high dynamic range displays used in computer systems, televisions, monitors, machine vision, automotive displays, virtual or augmented reality displays, etcetera.

Prior (Digital) Transport of Video Information to a Display Panel

FIG. 1 illustrates a prior art delivery of a digital signal to a display panel within a display unit 100, so called "display connectivity." For purposes of this disclosure, "display panel" refers to those interior portions of the display that implement pixels that produce light for viewing, while "display unit" refers to the entire (typically) rectangular enclosure that includes the display panel, a panel assembly, a frame, drivers, cabling, and associated electronics for producing video images. In general, a mass-producible display panel containing O(N^2) pixels is controlled by O(N) voltages, each updated O(N) times per display interval (the inverse of the frame rate).

Shown is an input of a digital video signal 112 into the display unit via an HDMI connector (RJ45 connector, etc.) to a system-on-a-chip (SoC) 110 of the display unit. SoC 110 transports the digital signal via a V-by-One HS standard 116 to a timing controller 120 (TCON) which then uses bit-serial transport 121 (e.g., SerDes, LVDS or CEDS) to any number of DACs (digital-to-analog converters) 122 within the source drivers of the display panel 118 in order to convert the digital signal into analog for input into pixels of the display panel. Digital transport may also use MLVDS, DDI, etc. A control signal 114 provides video framing flags (Vsync, Hsync, etc.), configuration parameters, gate driver control signals, FRC grayscale, driver parameter settings, backlight control, contrast control, etc.

In addition to the disadvantages above, this display connectivity digital transport results in higher EMI/RFI concerns due to reliance on high-speed digital circuits, requires high power, is hard to synchronize, and must be implemented using relatively costly integrated circuit processes. Further, for example an 8K V-by-One HS requires 48 wire pairs at 3.5 Gbps.

Further, these drawbacks of display connectivity are present in local-site video connectivity as well. For instance, a GPU of a computer generates a video signal that is transported digitally to a display unit (via V-by-One HS, MLVDS, DDI, etc.), where again, DACs within the source drivers convert the signal to analog. Typically, the GPU chip is located on the system/microprocessor board, as close as possible to the microprocessor.

Therefore, it is realized that performing the conversion of the digital video signal from digital to analog as close as possible to the SoC, GPU, or digital video processor will not only eliminate the need for DACs within the source drivers of the display panel but will also realize the above advantages in transporting an analog signal instead of a digital signal within the display unit or to a display unit.

Figure 2:
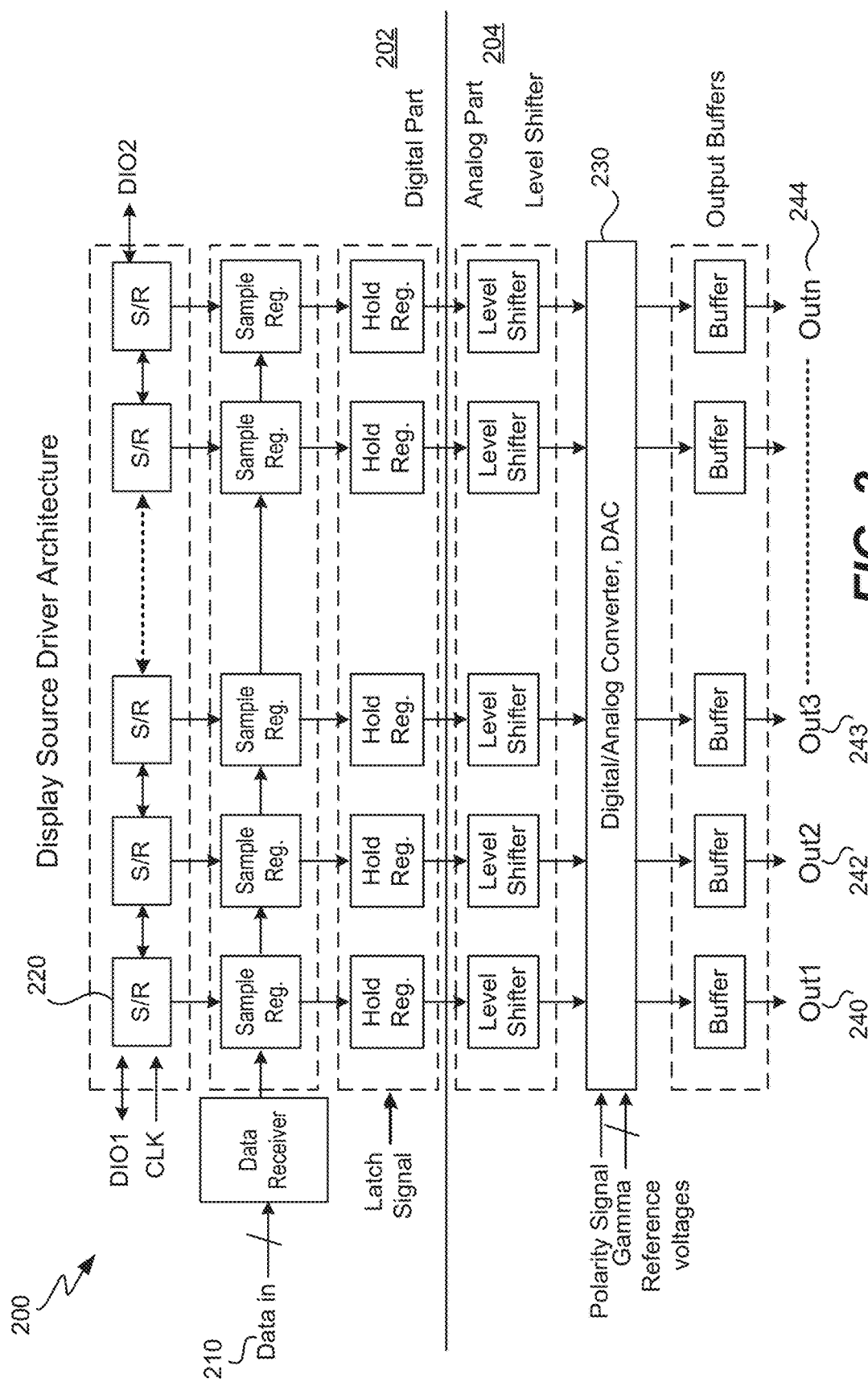
FIG. 2 illustrates a prior art display driver architecture of a display, such as a display panel.

FIG. 2 illustrates a prior art display source driver architecture of a display, such as display panel 118. Shown is a source driver 200, which will typically have 900 to 1,000 outputs, or more. There are multiple instances of this source driver within every display which are cascaded together via the top row, so that the DIO1 and the DIO2 connects any two of the series (via shift registers 220). The drivers thus extend in the horizontal direction and there are between one and twenty of these drivers within a typical display unit. Data in 210 is the serialized digital data coming from the timing controller of the SoC. Each source driver has generally a digital portion 202 and an analog portion 204 which includes a DAC 230. Outputs 240-244 are output into the display columns, i.e., directly into the glass of the display, in order to drive the sources of each pixel as is well known in the art.

Source driver 200 requires that a large part of its driver area is used by digital electronics that need a 10× higher data rate than the associated signal to be provided to the column line of the display. This is disadvantageous because the total power consumed by any (digital or analog) circuit is linearly dependent on the switching frequency, usually the clock frequency.

Display Connectivity

Figure 3:
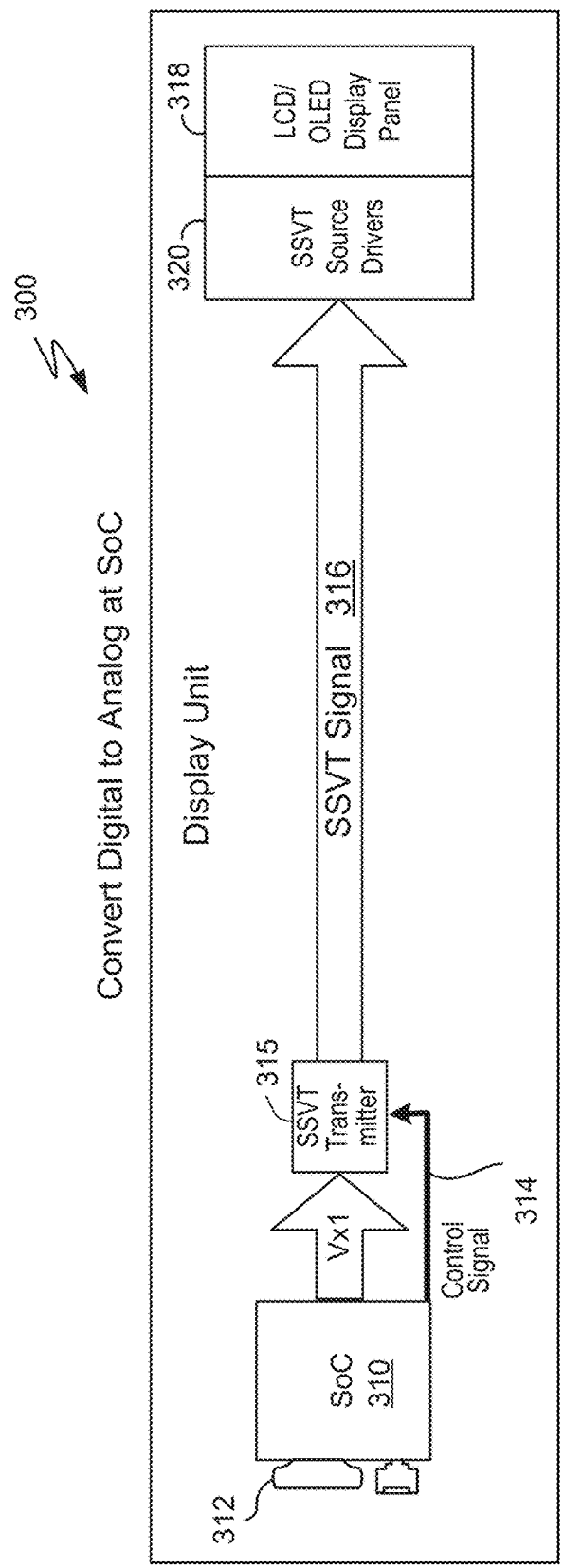
FIG. 3 illustrates delivery of an analog video signal to a display panel using conversion near the SoC of the display unit.

FIG. 3 illustrates delivery of an analog video signal to a display panel 318 using conversion at or near the SoC 110 of a display unit 300. In this embodiment, converting of, and encoding of the digital video signal into an analog SSVT signal occurs within the display unit (and even within the panel assembly) itself, thus improving display connectivity. Shown is an input of a digital video signal 312 via an HDMI connector (or RJ45 connector, etc., as the invention works with content streamed over the Internet) into a system-on-a-chip 310. The digital signal is transmitted via V-by-One (or other bit-serial transmission) to an SSVT transmitter 315 (which may be implemented within an integrated circuit, e.g., a chip) in which the SSVT transmitter converts the digital video signal into a spread-spectrum video transport (SSVT) signal 316 which is transported to a display panel 318 by way of novel SSVT source drivers 320. Not shown is the timing controller (TCON) which is located between the SoC 310 and SSVT transmitter 315. In one embodiment the SSVT transmitter 315 is implemented within its own integrated circuit and the SoC and TCON are separate, in another embodiment both the SSVT transmitter 315 and TCON are combined within a single integrated circuit, and in another the transmitter 315, TCON and SoC are all combined within a single integrated circuit. Although not shown in this drawing, if the TCON were separate, it would be located between SoC 310 and SSVT transmitter 315.

Control signal 314 may also provide gate driver control signals, FRC grayscale, driver parameter settings, backlight control, contrast control, etc. as mentioned above, but is not mandatory. Display panel 318 has associated any number of SSVT source drivers 320 (implemented as any number of chips) which then decode the analog SSVT signal 316 into analog voltages expected by the display panel as will be described in greater detail below. It is contemplated that a display panel driver chipset includes integrated circuits 315 and 320.

Note that no DACs (digital-to-analog converters) are needed at the display panel nor within the novel source drivers described below. Advantageously, display unit 300 may be implemented in mature IC processes, EMI/RFI emissions are well below mandated limits, only one-half the power is needed, it is easier to synchronize, and an 8K display will only require 8 wire pairs at 1.6 GHz or 18 wire pairs at 680 MHz. By contrast, prior art transport of a digital video signal within a display unit from the system-on-a-chip (SoC) must be implemented in relatively costly IC processes, EMI/RFI emissions are a concern due to reliance upon high-speed digital circuits, and an 8K/60 Hz display will require 8 wire pairs at 16 Gbps or 36 wire pairs at 3.5 Gbps.

Local Site Video Connectivity

Figure 4:
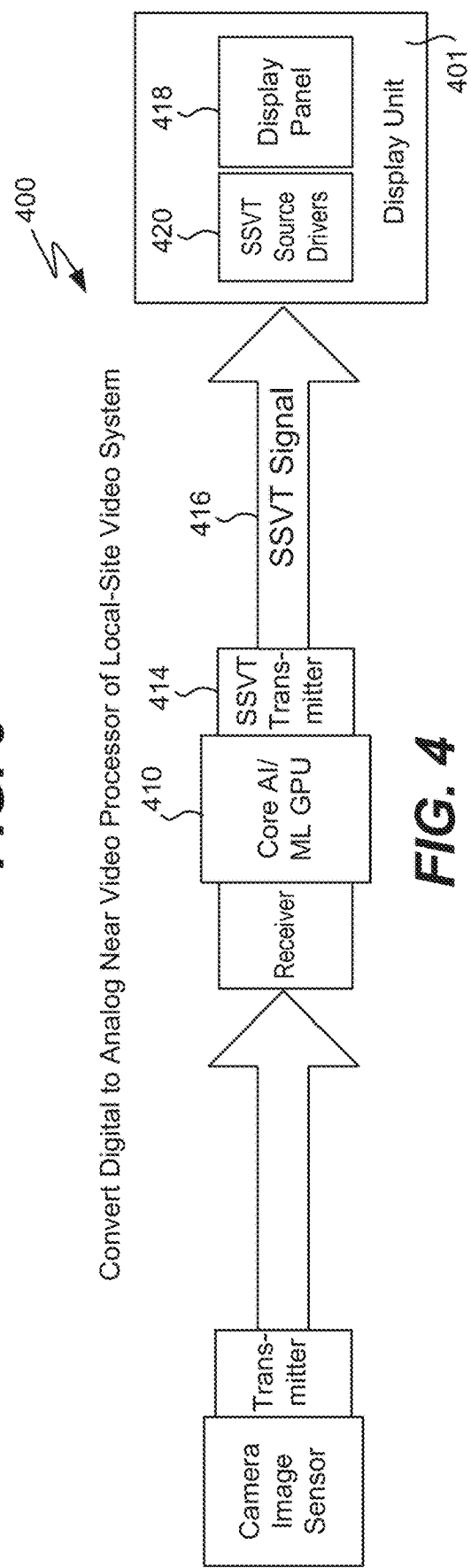
FIG. 4 illustrates delivery of an analog video signal to a display unit using conversion near a digital video processor of a local-site video system.

FIG. 4 illustrates delivery 400 of an analog video signal to a display panel using conversion near a digital video processor of a local-site video system. In this embodiment, converting of, and encoding of the digital video signal into an analog SSVT signal occurs outside of a display unit 401 or a display panel. Input to the display unit 401 is thus the analog SSVT signal. Shown is a core AI/ML GPU 410 producing a digital video signal; an SSVT transmitter 414 encodes the digital signal into the analog spread-spectrum video transport (SSVT) signal 416 which is transported to a display unit and thus to a display panel 418. The display unit includes any number of SSVT source drivers 420 which then decode the SSVT signal into analog voltages expected by the display panel as will be described in greater detail below. Note that no DACs (digital-to-analog converters) are needed within the display unit, at the display panel or within the drivers.

The GPU 410 where the video data is processed may be within a computer. Once converted and encoded by the SSVT transmitter 414 the analog signal 416 is transported to the display unit 401. That display unit may be nearby, 10 meters away, or even farther. Thus, the information path from the graphics or video processor, which may be effectively the computer, goes over a number of transfer connections directly to the display unit without ever being digital anywhere in that data path. Originally, the video signal may begin at a camera or similar device as shown in FIG. 4 from where it is transported to the GPU 410. The video signal may also originate at a camera, video processor or internet modem at which location it may also be converted to SSVT using a transmitter 414.

Advantageously, the farther upstream of a display unit that we perform the D-to-A conversion and the encoding into an SSVT signal (i.e., not performing the conversion and encoding within the display unit itself), the more benefits we obtain, because we do not need to perform compression to transfer a compressed digital video signal across an HDMI cable. In this particular embodiment, we handle the full resolution display information in the GPU, then perform the conversion and encoding on a chip at the GPU, then all the transfer is via a relatively low-frequency SSVT signal until that signal reaches the display unit. In this case, we have handled the entire display resolution at full frame rate from the GPU source to the display unit endpoint without any internal compression.

Display Connectivity Detail

Figure 5:
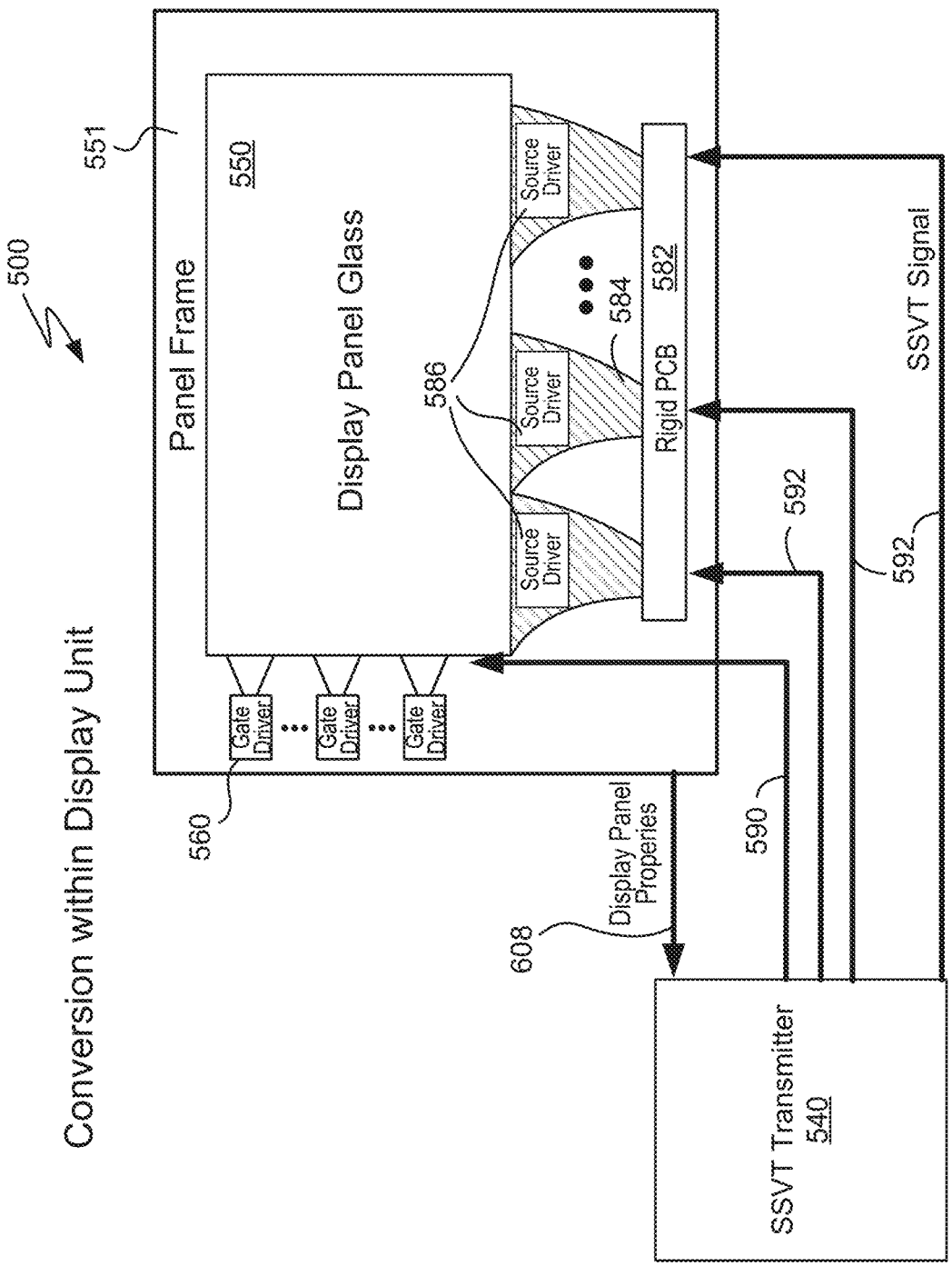
FIG. 5 illustrates delivery of an SSVT analog video signal to a display panel using conversion and encoding within the display unit.

FIG. 5 illustrates delivery of an SSVT analog video signal to a display panel 550 of a display unit 500 using conversion and encoding within the display unit. In this embodiment, converting of, and encoding of the digital video signal into an analog SSVT signal occurs within the display unit 500 itself, thus improving display connectivity. Not shown are the SoC and TCON of the display unit. As mentioned above, there may be three or more commercial embodiments: a discrete implementation in which the SSVT transmitter is embedded in a mixed-signal integrated circuit and the TCON and SoC are discrete components (the SSVT transmitter "adapter chip" is inserted between a legacy TCON and the novel source drivers described herein—the SSVT transmitter translates TCON output signals into SSVT signals); a mixed-implementation in which the SSVT transmitter is integrated with the TCON in a single IC and the SoC is discrete; and a fully-integrated implementation in which as many functions as possible are integrated in a custom mixed-signal integrated circuit (the SSVT transmitter is integrated with the TCON and the SoC).

In a demonstration system (not shown), SOC digital functions are implemented in a GPU which communicates via HDMI 2.0 with an FPGA carrier board which implements TCON digital functions communicating with a custom mixed-signal PCB implementing the SSVT transmitter within an analog subsystem. The SoC functions (such as decompressing the compressed digital video signal) are performed in software in the GPU, while TCON functions (such as generating timing signals for the gate and source drivers) are performed in software and in soft circuits on the FPGA.

In this example of FIG. 5, the display panel 550 is within a panel frame 551 as shown which is within a 55" HDR 4K60 display unit. As shown, SSVT transmitter 540 and the panel frame 551 are all within the display unit 500. Display panel 550 may be a display panel of any size, may be a display or displays within a VR headset, may be a heads-up display (HUD) in which the display is projected onto a windshield, a screen of a visor, etc.

There is a significant advantage to using an SSVT signal internally in a display unit even if the input signal is not SSVT, i.e., it is a digital video signal. In prior art display units, one decompresses the HDMI signal and then one has the full fledged, full bit rate digital data that must then be transferred from the receiving end of the display unit to all locations within the display unit. Those connections can be quite long for a 64- or 80-inch display; one must transfer that digital data from one side of the unit where the input is to the other side where the final display source driver is. Therefore, there is an advantage to converting the digital signal to SSVT internally and then sending that SSVT signal to all locations of the display unit where the source drivers are located. Specifically, the advantages are that it is possible to use lower frequency, lower EMI signals, and benefit from embedded synchronization/low latency initialization.

Also shown within FIG. 5 is an SSVT transmitter 540 that generates an SSVT signal 592 for the source drivers 586 as well as power and control signals 590 for the gate drivers 560. Included are a rigid PCB 582 as well as individual flexible PCBs 584 each holding a source driver 586 which generate source voltages for the display panel. As will be described in greater detail below, signals 608 optionally provide information concerning the display panel back to the transmitter 540 to assist with encoding of the SSVT signal. Generation of the gate driver control signals 590 may be performed by the timing controller (or by other specific hardware) based on synchronization information from the source drivers.

Typically, an SSVT transmitter and an SSVT receiver (in this case, source drivers 586) are connected by a transmission medium. In various embodiments, the transmission medium can be a cable (such as HDMI, flat cable, fiber optic cable, metallic cable, non-metallic carbon-track flex cables), or can be wireless. There may be numerous EM pathways of the transmission medium, one pathway per encoder. The SSVT transmitter includes a distributor and multiple encoders. The SSVT receiver will include multiple decoders, the same number as the encoders. The number of pathways on the transmission medium may widely range from one to any number more than one. In this example, the medium will be a combination of cable, traces on PCBs, IC internal connections, and other mediums used by those of skill in the art.

During operation, a stream of time-ordered video samples containing color values and pixel-related information is received from a video source at the display unit 500 and delivered to the SSVT transmitter 540 via the SoC and TCON (processing by the SoC may be performed as is known in the art). The number and content of the input video samples received from the video source depends upon the color space in operation at the source (and, the samples may be in black and white). Regardless of which color space is used, each video sample is representative of a sensed or measured amount of light in the designated color space.

As a stream of input digital video samples is received within the SSVT transmitter, the input digital video samples are repeatedly (1) distributed by assigning the video samples into encoder input vectors according to a predetermined permutation (one vector per encoder) and (2) encoded by applying an SSDS-based modulation to each of the multiple encoder input vectors, using orthogonal codes, to generate multiple composite EM signals with noise-like properties (one analog signal from each encoder). The analog EM signals are then transmitted (3) over a transmission medium, one signal per pathway.

For purposes of explanation, one possible permutation implemented by a distributor for building four vectors $V_0$, $V_1$, $V_2$ and $V_3$ is one in which each of the vectors includes N samples of color information. In this example, the exposed color information for the sets of samples is "RGB" respectively. The exposed RGB samples of the sets of samples in this example are assigned to vectors $V_0$, $V_1$, $V_2$ and $V_3$ from left to right. In other words, the "R", "G" and "B" values of the left most sample and the "R" signal of the next set of samples are assigned to vector $V_0$, whereas the next (from left to right) "G", "B", "R" and "G" values of the next sample are assigned to vector $V_1$, the next (from left to right) "B", "R", G" and "B" values are assigned to vector $V_2$, and the next (from left to right) "R", "G", "R" and "R" values are assigned to vector $V_3$. Once the fourth vector $V_3$ has been assigned its signals, the above process is repeated until each of the four vectors $V_0$, $V_1$, $V_2$ and $V_3$ have N samples. In various embodiments, the number of N samples may widely vary.

By way of example, consider an embodiment with N=60. In this case, the total number of N samples included in the four vectors $V_0$, $V_1$, $V_2$ and $V_3$ is 240 (60×4=240). The four encoder input vectors $V_0$, $V_1$, $V_2$ and $V_3$, when completely built up, include the samples (where S=3) for 80 distinct sets of samples (240/3=80). In other words:

Vector $V_0$ includes Samples $P_0$, $N_0$ through $P_0$, $N_{N-1}$;
Vector $V_1$ includes Samples $P_1$, $N_0$ through $P_1$, $N_{N-1}$;
Vector $V_2$ includes Samples $P_2$, $N_0$ through $P_2$, $N_{N-1}$; and
Vector $V_3$ includes Samples $P_3$, $N_0$ through $P_3$, $N_{N-1}$.

It should be understood that the above example is merely illustrative and should not be construed as limiting. The number of samples N may be more or less than 60. Also, it should be understood that the exposed color information for each set of samples can be any color information (e.g., Y, C, Cr, Cb, etc.) and is not limited to RGB. The number of EM pathways over the transmission medium can also widely vary. Accordingly, the number of vectors V and the number of encoders may also widely vary from one to any number larger than one. It should also be understood that the permutation scheme used to construct the vectors, regardless of the number, is arbitrary. Any permutation scheme may be used, limited only by whichever permutation scheme that is used on the transmit side is also used on the receive side.

Each vector of N samples is then encoded by its corresponding encoder and produces L output levels in parallel, using the encoding scheme described herein and shown specifically in FIGS. 14-17. Preferably, L>=N>=2. As described, the encoding may be analog (DACs placed before the encoders) or digital (in which the L levels are converted to analog by a DAC before being transmitted). The L analog output levels are then transmitted over its EM pathway as part of the SSVT signal to an SSVT receiver, which in this case are the source drivers 586. Advantageously, the SSVT signal is an analog signal and no DACs are required at the source drivers.

Although not shown in FIG. 5, SSVT transmitter 540 may also be located external to the display unit.

Display Panel Source Driver

Figure 6:
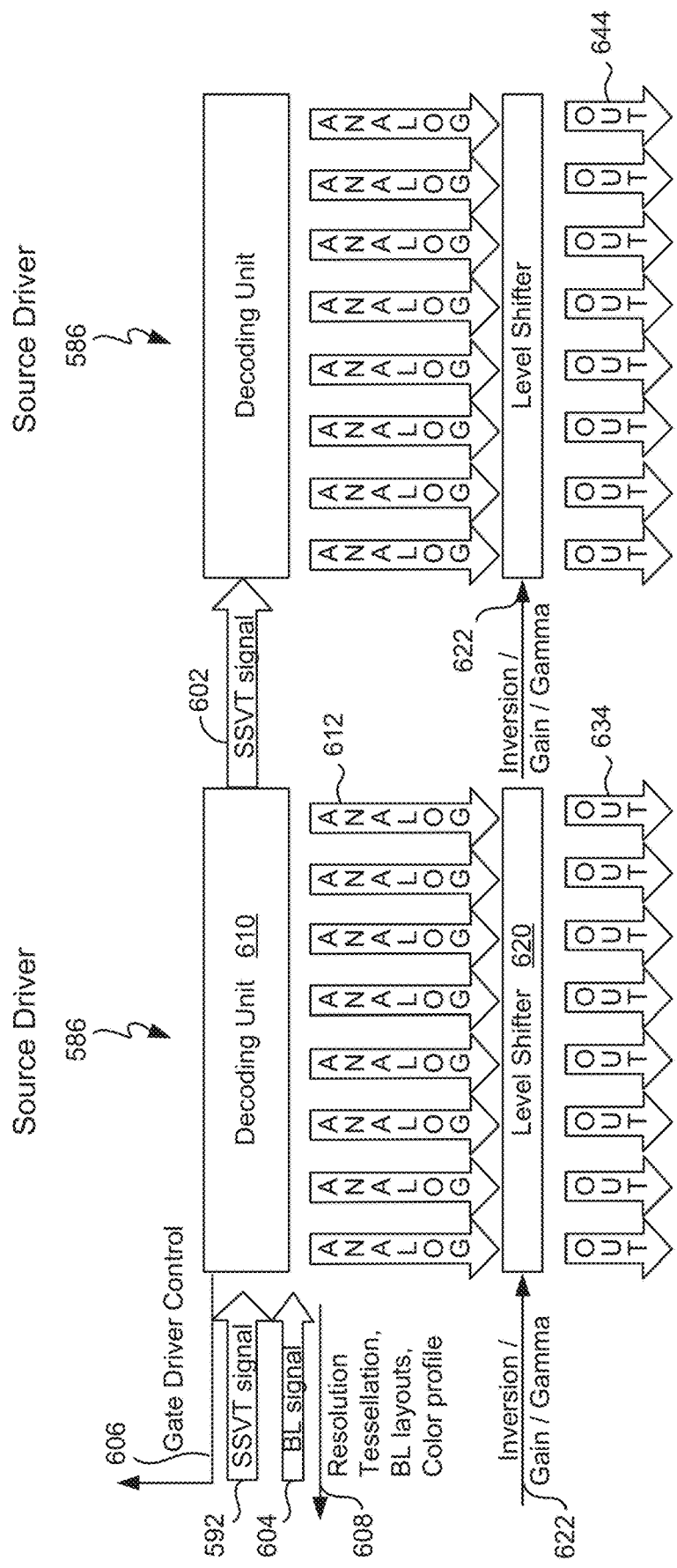
FIG. 6 illustrates examples of display source drivers.

FIG. 6 illustrates display source drivers 586. Multiple source drivers are cascaded as shown and as known in the art; these multiple source drivers then drive the display panel. As shown, a source driver 586 does not require a DAC (in the signal path for converting digital samples into analog samples for display) as required in prior art source drivers. Input to a decoding unit 610 of each source driver is an analog SSVT signal 592 that has been encoded upstream either within the display unit itself or external to the display unit as is described herein. As shown, SSVT signal 592 is daisy chained between source drivers. In an alternative embodiment, each source driver will have its own SSVT signal and the TCON provides timing information to each source driver chip.

Decoding unit 610 may have any number (P) of decoders and having only a single decoder is also possible. Unit 610 decodes the SSVT signal or signals (described in greater detail below) and outputs numerous reconstructed analog sample streams 612, i.e., analog voltages (the number of samples corresponding to the number of outputs of the source driver). Because these analog outputs 612 may not be in the voltage range required by the display panel they may require scaling, and may be input into a level shifter 620 which shifts the voltages into a voltage range for driving the display panel using an analog transformation. Any suitable level shifters may be used as known in the art, such as latch type or inverter type. Level shifters may also be referred to as amplifiers.

By way of example, the voltage range coming out of the decoding unit might be 0 to 1 V and the voltage range coming out of the level shifter may be −8 up to +8 V (using the inversion signal 622 to inform the level shifter to flip the voltage every other frame, i.e., the range will be −8 to 0 V for one frame and then 0 V to +8 V for the next frame). In this way, the SSVT signals do not need to have their voltages flipped every frame; the decoding unit provides a positive voltage range (for example) and the level shifter flips the voltage every other frame as expected by the display panel. The decoding unit may also implement line inversion and dot inversion. The inversion signal tells level shifter which voltages to switch. Some display panels such as OLED do not require this voltage flipping every other frame in which case the inversion signal is not needed and the level shifter would not flip voltages every other frame. Display panels such as LCD do require this voltage flipping. The inversion signal 622 is recovered from the decoding unit as will be explained below.

Also input into the level shifter 620 can be a gain and a gamma value; gain determines how much amplification is applied and the gamma curve relates the luminous flux to the perceived brightness which linearizes human's optical perception of the luminous flux. Typically, in prior art source drivers both gain and gamma are set values determined by the manufactured characteristics of a display panel. In the analog level shifter 620 gain and gamma may be implemented as follows. Gamma is implemented in the digital part of the system in one embodiment, and level shifting and gain are implemented in the driver by setting the output stage amplification. In the case of gamma, implementation is also possible in the output driver, by implementing a non-linear amplification characteristic. Once shifted, the samples are output into outputs 634 which are used to drive the source electrodes in their corresponding column of the display panel as is known in the art.

In order to properly encode an SSVT signal for eventual display on a particular display panel (whether encoded within the display unit itself or farther upstream outside of that display unit) various physical characteristics or properties of that display panel are needed by the GPU (or other display controller) or whichever entity performs the SSVT encoding. These physical characteristics are labeled as 608 and include, among others, resolution, tessellation, backlight layout, color profile, aspect ratio, and gamma curve. Resolution is a constant for a particular display panel; tessellation refers to the way of fracturing the plane of the panel into regions in a regular, predetermined way and is in units of pixels; backlight layout refers to the resolution and diffusing characteristic of the backlight panel; color profile is the precise luminance response of all primary colors, providing accurate colors for the image; and the aspect ratio of a display panel will have discrete, known values.

These physical characteristics of a particular display panel may be delivered to, hardwired into, or provided to a particular display controller in a variety of manners. In one example as shown in FIG. 5, signal 608 delivers values for these physical characteristics directly from the display panel (or from another location within a display unit) to the SSVT transmitter 540. Or, an SSVT transmitter 540 embedded within a particular display unit comes with these values hardcoded within the transmitter. Or, a particular display controller is meant for use with only particular types of display panels and its characteristic values are hardcoded into that display controller.

Input to the display panel can also be a backlight signal 604 that instructs the LEDs of the backlight, i.e., when to be switched on and at which level. In other words, it is typically a low-resolution representation of an image meaning that the backlight LEDs light up where the display needs to be bright and they are dimmed where the display needs to be dim. The backlight signal is a monochrome signal that can also be embedded within the SSVT signal, i.e., it can be another parallel and independent video signal traveling along with the other parallel video signals, R, G and B (for example), and may be low or high resolution.

Output from decoding unit 610 is a gate driver control signal 606 that shares timing control information with gate drivers 560 on the left edge of the display panel in order to synchronize the gate drivers with the source drivers. Typically, each decoding unit includes a timing acquisition circuit that obtains the same timing control information for the gate drivers and one or more of the source driver flex foils (typically leftmost and/or rightmost source driver) will conduct that timing control information to the gate drivers. The timing control information for the gate drivers is embedded within the SSVT signal and is recovered from that signal using established spread spectrum techniques.

Typically, a conventional display driver is connected directly to glass using "COF" (Chip-on-Flex or Chip-on-Foil) IC packages; conventional COG (chip-on-glass) is also possible but is not common on large displays. It is possible to replace these drivers by the novel source drivers of FIGS. 6 and 7, thus turning an existing display panel into an SSVT-enabled panel. The inputs of these ICs are usually connected together by a PCBA, providing the input signals from a video source and timing controller. These can be close to or far away from the display panel, transferring the video and control signals across an inexpensive wire.

SSVT Decoding and Integration with Source Driver Detail

On the receive side, the decoders of each source driver are responsible for decoding the stream of the differential EM level signals received over the transmission medium back into a format suitable for display. Once in the suitable format, the video content contained in the samples can be presented on a video display, frame after frame. As a result, the video capture by any video source can be re-created by a video sink. Alternatively, the decoded video information can be stored for display at a later time in a time shifted mode.

Figure 7:
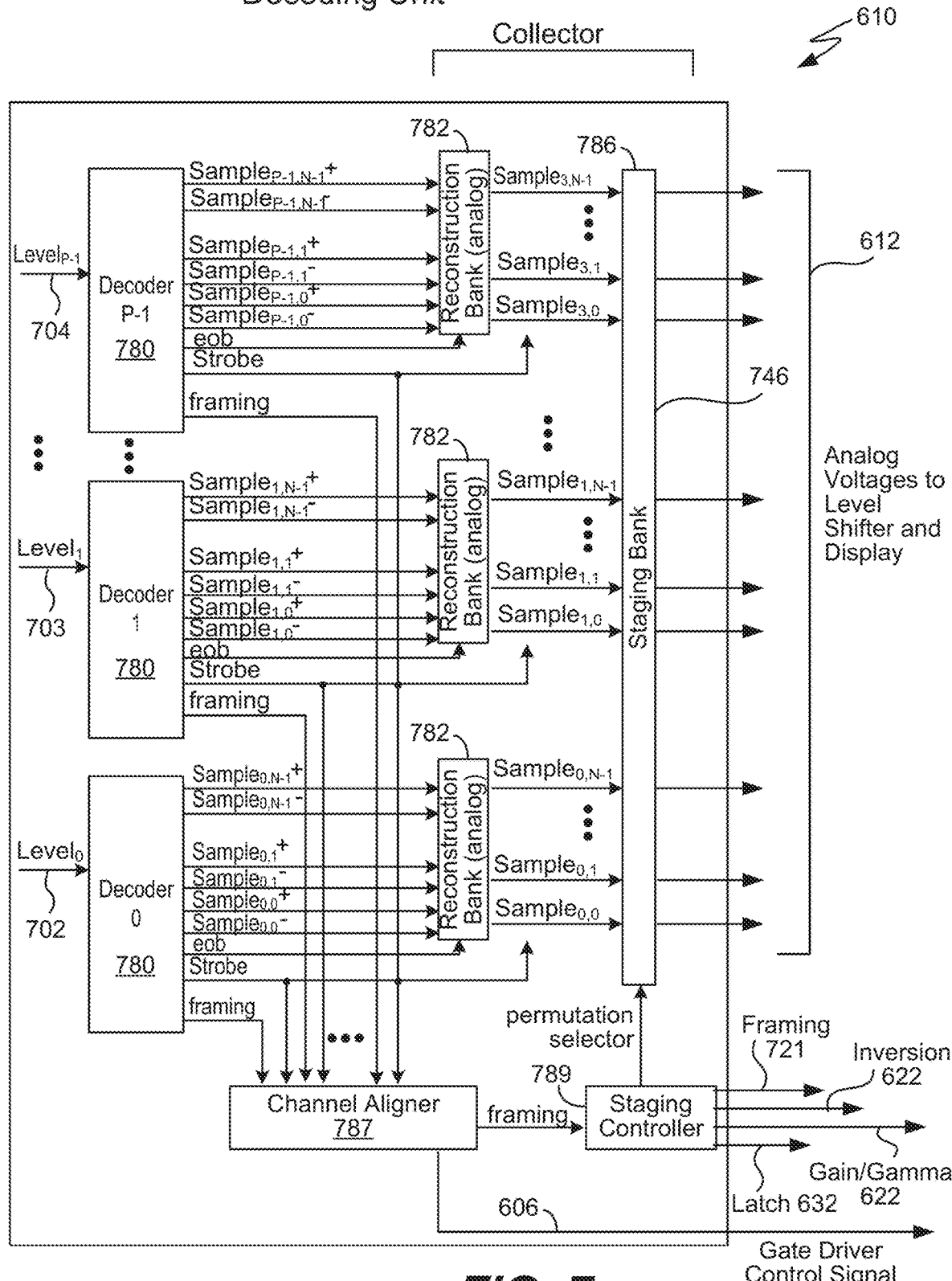
FIG. 7 illustrates a more detailed view of a decoding unit and its outputs.

FIG. 7 illustrates a more detailed view of a decoding unit 610 of a source driver. P represents the number of input electromagnetic pairs, each pair carrying an SSVT signal independent from the others, except that they are isochronous signals, known to have been generated in lockstep with one another by encoders on the transmit side. The source driver contains P decoders 780 and a collector (blocks 782, 786). A decoder 780 performs the inverse transform of its paired encoder on the transmit side and reconstructs its input differential EM level signals into an output vector of N reconstructed samples (although single-ended inputs rather than differential inputs may be used). The collector assigns the decoder output vector samples (or, "reconstructed samples") to their predetermined positions in the source driver inputs 612. The source driver inputs 612 include S reconstructed samples corresponding to the driven group of columns in the display panel. The retimer function is included within the collector.

The P decoders 780 (labeled 0 through P−1) are arranged to receive differential EM level signals $Level_0$ through $Level_{P-1}$ respectively, 702-704. In response, each of the decoders 780 generates N differential pairs of reconstructed samples ($Sample_0$ through $Sample_{N-1}$). In the case where there are four decoders 780 (P=4), four vectors $V_0$, $V_1$, $V_2$ and $V_3$ are constructed respectively. The number of samples, N, is exactly equal to the number of orthogonal codes used for the earlier encoding i.e., there are N orthogonal codes used, meaning N codes from the code book.

Reconstruction banks 782 sample and hold each of the differential pairs of N reconstructed samples ($Sample_0$ through $Sample_{N-1}$) for each of the four decoder output vectors $V_0$, $V_1$, $V_2$ and $V_3$ at the end of each decoding interval respectively. These received differential pair of voltage signals are then output as samples ($Sample_{N-1}$ through $Sample_0$) for each of the four vectors $V_0$, $V_1$, $V_2$ and $V_3$ respectively. Essentially, each reconstruction bank reconstructs from a differential pair to a single voltage. The staging bank 786 receives all the reconstructed samples ($N_{n-1}$ through $N_0$) for each of the four decoder output vectors $V_0$, $V_1$, $V_2$ and $V_3$ and serves as an analog output buffer as will be described in greater detail below. Once the samples are moved into staging bank 786 they are triggered by a latch signal 632 derived from the decoded SSVT signal. The latch signal may be daisy-chained between source drivers. Once the samples are released from the staging bank they are sent to level shifter 620.

Decoding unit 610 also includes a channel aligner 787 and a staging controller 789, which receives framing information and aperture information from each decoder 780. In response, the staging controller 789 coordinates the timing of the staging bank 786 to ensure that all the samples come from a common time interval in which the level signals were sent by the SSVT transmitter. As a result, the individual channels of the transmission medium do not necessarily have to all be the same length since the channel aligner 787 and staging controller 789 compensate for any timing differences. The gate driver control signal 606 provides the timing information to the gate drivers (or to intermediate circuitry) which in turn provides the correct timing and control signals to the gate drivers, and may originate from channel aligner 787.

Note that FIG. 7 discloses a decoder that buffers the samples in staging bank 786 and then shifts levels (amplifies); it is also possible to shift levels and then buffer the samples for output.

Display Panel Source Driver Array

Figure 8:
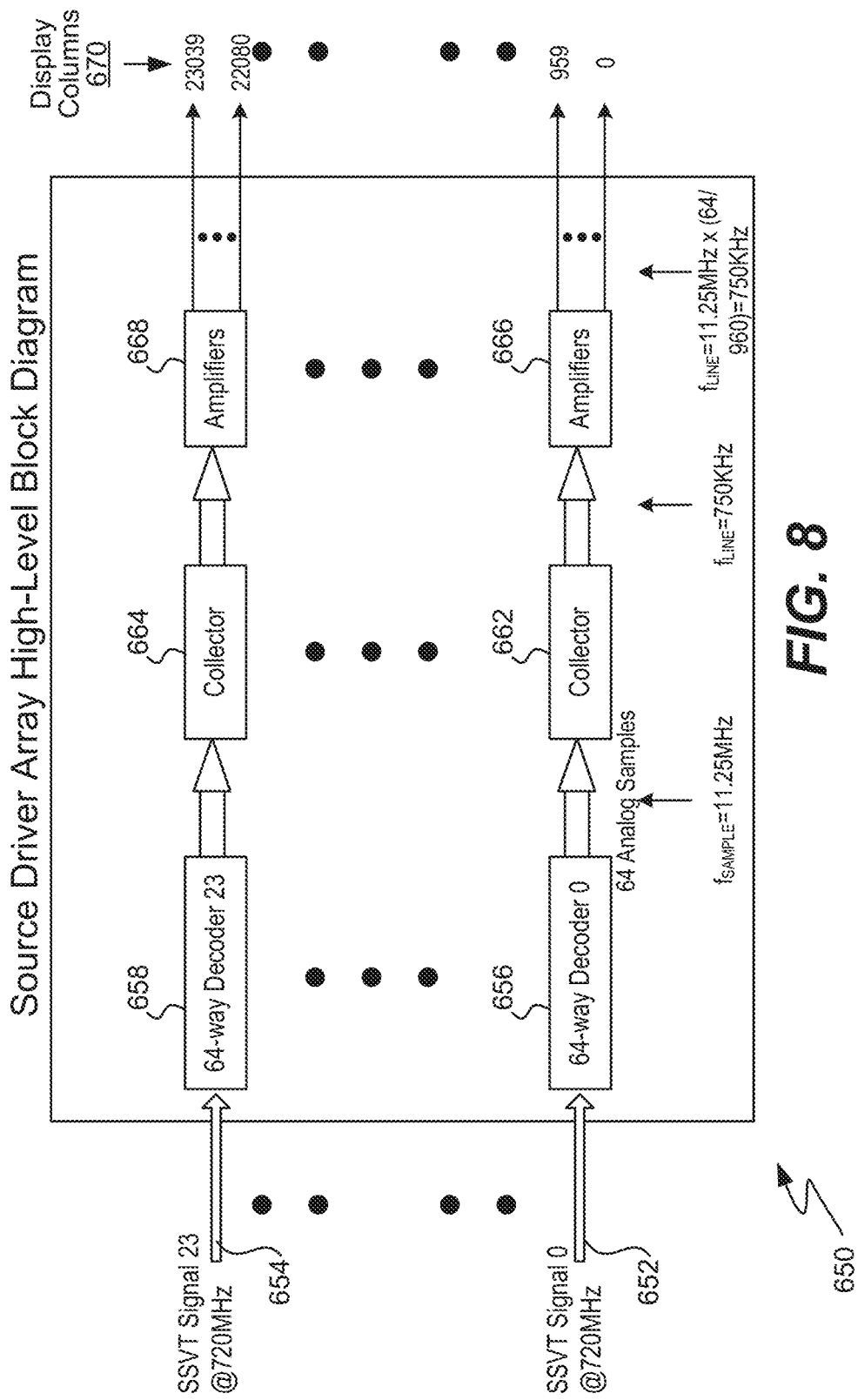
FIG. 8 shows source drivers that buffer the samples and then amplify.

FIG. 8 illustrates an alternative embodiment for implementing an array of source drivers. Array 650 is suitable for use with a display panel having 8K resolution and a 144 Hz refresh rate, i.e., an "8K144" panel. FIG. 8 shows in this embodiment that each source driver includes a single decoder (i.e., a decoding unit of one decoder) followed by a collector and amplifiers whereas FIGS. 6 and 7 show that each source driver may have many decoders within the decoding unit of the source driver. Either approach may be used.

Shown are 24 720 MHz SSVT signals 652-654, each being a twisted-wire pair from an SSVT transmitter 540, that is, each twisted wire pair originating at an encoder of the transmitter. Each pair is input into one of decoders 656-658, each decoder outputting 64 analog samples at a frequency of 11.25 MHz. These samples are each input into one of 24 collectors 662-664, each collector collecting 15 sets of these samples before updating its output once every 15 decoding intervals as is shown in greater detail below. As mentioned above, each collector consists of a reconstruction bank plus a staging bank (not shown explicitly in this drawing). In turn, these 960 analog samples from each collector are then input at a frequency of 750 kHz into one of amplifiers 666-668 for amplification before being output at a frequency of 750 kHz (11.25 MHz×64/960) as amplified analog levels 670 onto the display columns of the display panel. In the interests of clarity, not shown are signals 604, 606, 608, 622, 632 which are shown in FIGS. 6 and 7.

Theoretically, the amplifiers or level shifters may be left out if the encoded SSVT signals are higher voltages and the decoded signals result in sample voltages that are required by a display. But, as the SSVT signal will typically be low voltage (and a higher voltage output is required for a display), amplification is necessary.

Note that FIG. 8 discloses a decoder that buffers the samples in collector 664 and then amplifies; it is also possible to amplify and then collect (buffer) the samples for output. Either embodiment may be used.

Figure 9:
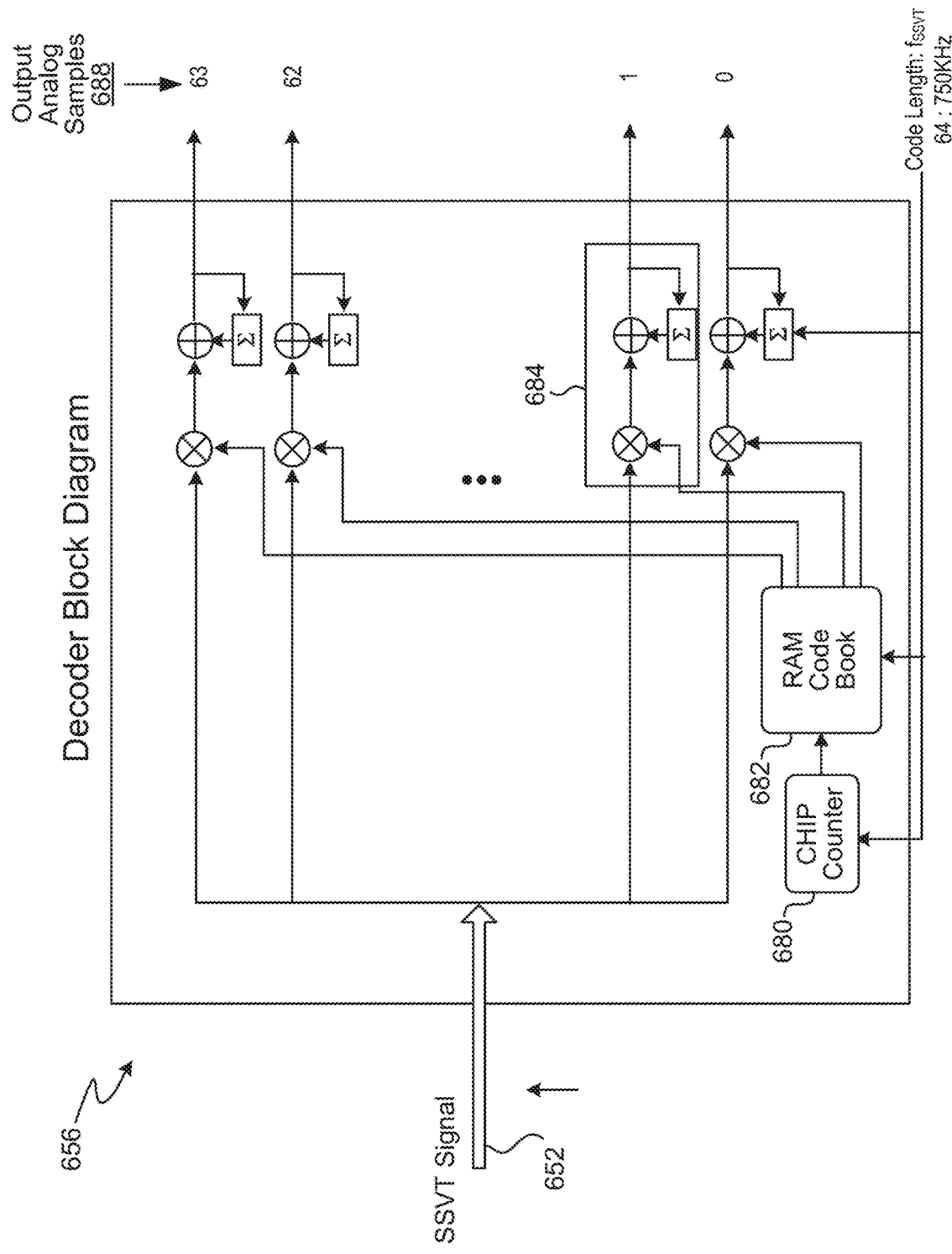
FIG. 9 is a block diagram of one of the decoders 656 from FIG. 8.

FIG. 9 is a block diagram of one of the decoders 656 from FIG. 8. Shown is one of the SSVT signals 652 being input to the decoder. The decoder includes a chip counter 680, a codebook 682 typically stored in RAM that contains the orthogonal codes used for encoding and decoding, as well as a block diagram 684 for each decoding circuit for each of the 64 output analog samples 688. Each group of 64 analog samples are output "valid" every 1 out of L cycles at 11.25 MHz. Decoding is explained in greater detail below along with specific circuit diagrams.

Figure 10:
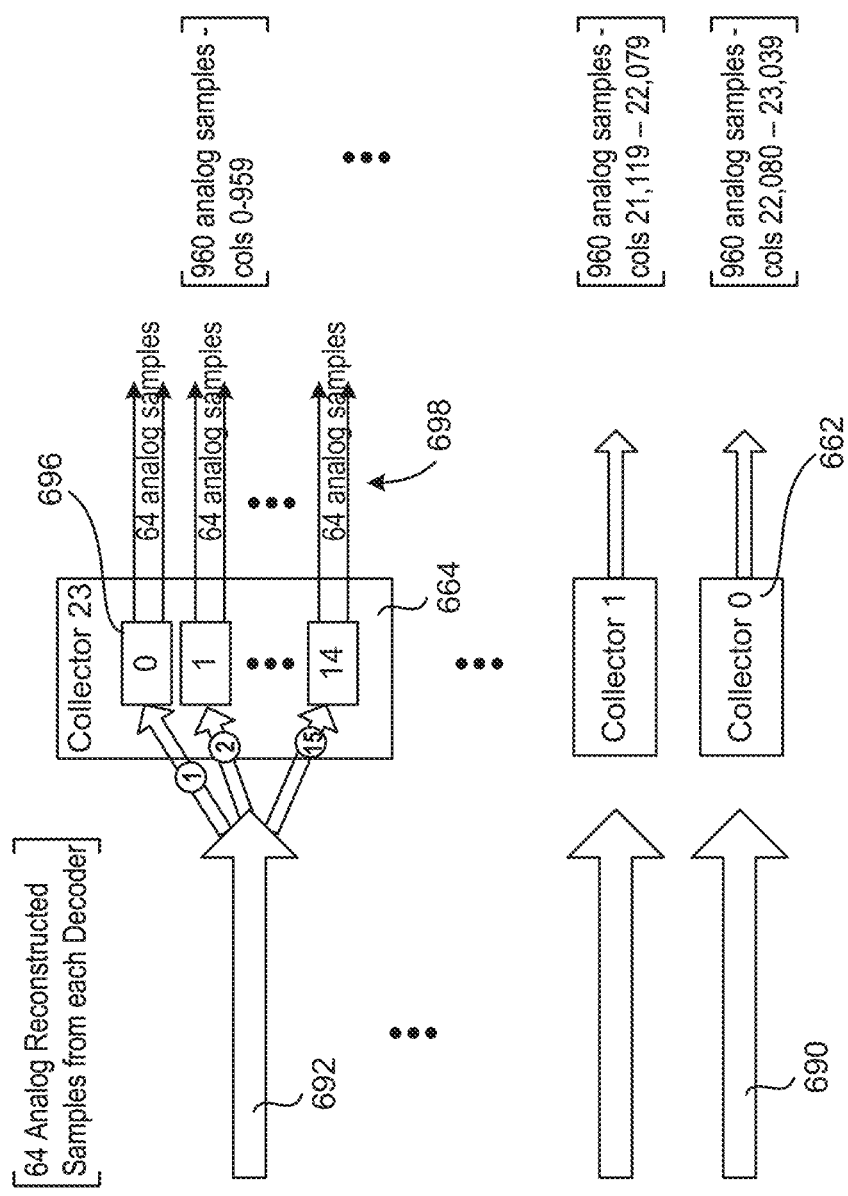
FIG. 10 is a block diagram of the collectors from FIG. 8.

FIG. 10 is a block diagram of the collectors from FIG. 8, and show more detail of the staging bank 786 from FIG. 7.

Basically, an individual collector performs serial-to-parallel conversion into a partitioned line buffer. Shown input into each of collectors 662-664 is a set of 64 analog samples 690-692 from each decoder at a frequency of 11.25 MHz (not shown is the reconstruction bank 782). As shown, during each decoding interval, a new set of incoming 64 reconstructed samples is stored within a collector, each collector being filled once every 15 decoding intervals. After each 15 decoding intervals, the 960 stored samples 698 from each collector are output into their corresponding amplifiers 666-668 before being delivered to the corresponding columns of the display panel as shown.

In one particular embodiment, each of the source drivers of FIG. 8 (e.g., decoder 658, collector 664 and amplifiers 668) are implemented within an integrated circuit and each such integrated circuit may be mounted upon a flexible PCB 584 as shown in FIG. 5.

Specific Display Panel Embodiments

In a first specific embodiment, the invention may be implemented within a large-area display panel (LDP), such as a TFT LCD Panel Frame Assembly having the following characteristics: an 8K144 resolution/frame rate; at least 10 bits of sub-pixel color depth; and is suitable for use within a display of 65" or larger. In this embodiment, SSVT transmitter 540 is implemented within a single integrated circuit and there are 24 source drivers 586, each implemented within a single integrated circuit. Transmitter 540 outputs 24 wire pairs 592 (SSVT signals), each with $f_{SSVT}$ up to 780 Msps, and each input of each source driver is a single SSVT signal wire pair, with $f_{SSVT}$ up to 780 Msps. The optical properties of this embodiment are on par with conventional LDPs, e.g., color reproduction, brightness and contrast and response time.

In a second specific embodiment, the invention may be implemented within a large-area display panel (LDP), such as an LCD Panel Frame Assembly having the following characteristics: an 8K240 resolution/frame rate; at least 10 bits of sub-pixel color depth; and is suitable for use within a display of 65" or larger. In this embodiment, SSVT transmitter 540 is implemented within a single integrated circuit and there are 24 source drivers 586, each implemented within a single integrated circuit. Input to the transmitter 540 is via CEDS (clock-embedded differential signaling), and it outputs 24 wire pairs 592 (SSVT signals), each with $f_{SSVT}$ up to 1,300 Msps; each input of each source driver is a single SSVT signal wire pair, with $f_{SSVT}$ up to 1,300 Msps, and each source driver outputs 960 columns. The optical properties of this embodiment are on par with conventional LDPs, e.g., color reproduction, brightness and contrast and response time.

SSVT Transmitter Integration Embodiments

Below are various embodiments describing various levels of integration of an SSVT transmitter with a GPU. These embodiments provide the advantages discussed above for various use cases such as game playing, home theater, retail signage, outdoor signage, public displays and television. In each of these embodiments below, an SSVT signal is generated external to the display unit and then delivered to source drivers of that display unit for displaying video data on a display panel within the display unit. Compared to conventional digital video transport techniques, these embodiments provide up to ten times the reach, 100 times the noise immunity and use less power (depending upon the level of integration).

Figure 11:
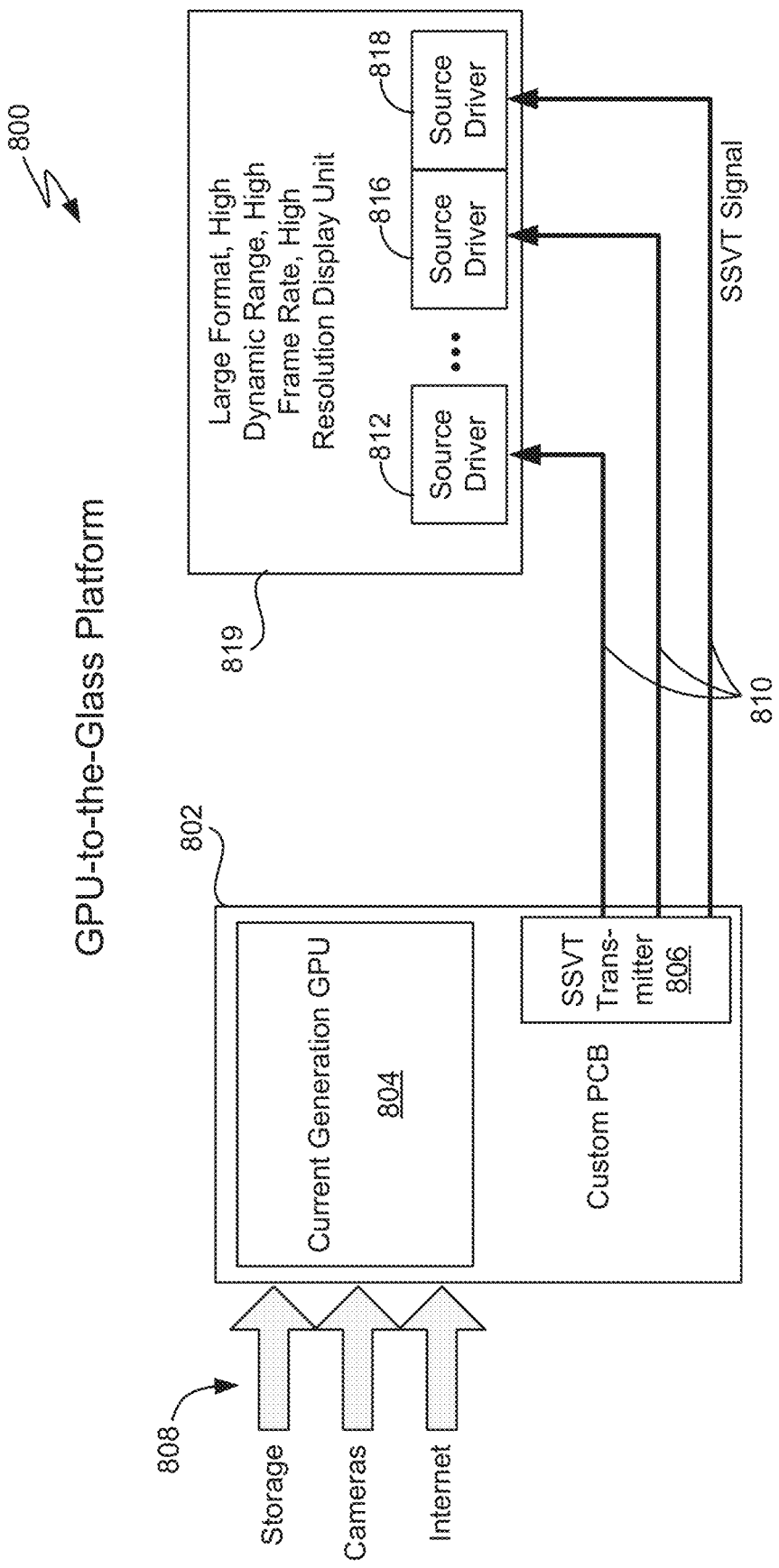
FIG. 11 illustrates a GPU-to-the-glass platform in which the platform is a custom printed circuit board that includes a current generation GPU as well as an SSVT transmitter.

FIG. 11 illustrates a GPU-to-the-glass platform embodiment 800 in which the platform is a custom printed circuit board 802 that includes a current generation (or "legacy") GPU IC 804 as well as an SSVT transmitter IC 806. In this embodiment, the SSVT transmitter is not integrated within the GPU. Video data is received from storage, cameras, Internet, etc., 808 and is processed by GPU 804 before being converted and encoded into an SSVT signal 810 by SSVT transmitter 806. This signal is then transported over any suitable EM pathway (physical wires, radio frequency or fiber-optic cable) to a display unit 819 where the signal is delivered to each of source drivers 812-818 and then decoded and displayed on a display panel as explained above. The display unit may include any large format, high dynamic range, high frame rate, high resolution display such as those described above. This PCB-level integration embodiment uses 20% less power compared to conventional techniques.

Figure 12:
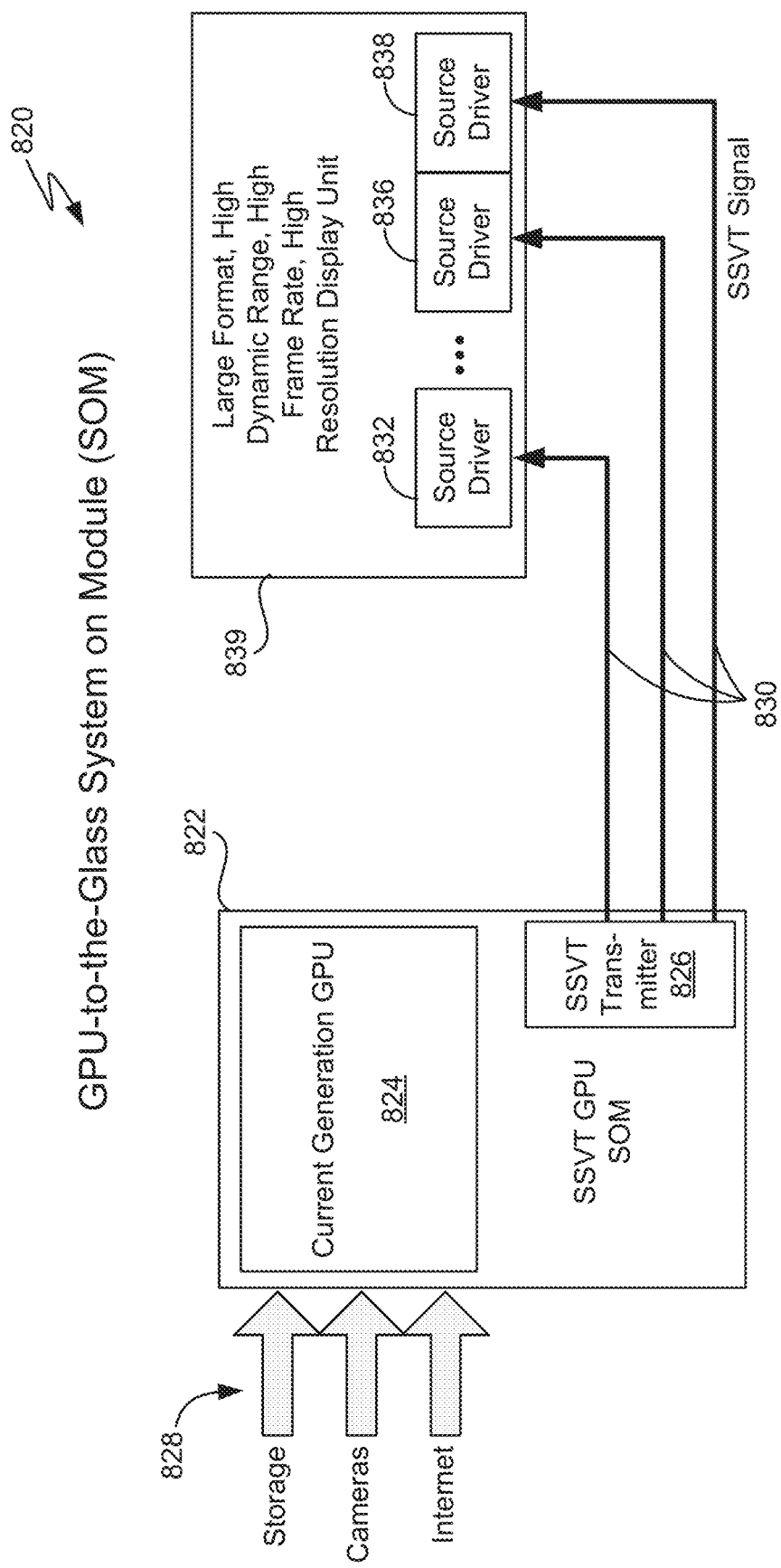
FIG. 12 illustrates a GPU-to-the-glass system-on-module (SoM) in which the system on module includes a current generation GPU as well as an SSVT transmitter.

FIG. 12 illustrates a GPU-to-the-glass system-on-module (SoM) embodiment 820 in which the SoM 822 includes a current generation GPU IC 824 as well as an SSVT transmitter IC 826; the ICs may be known-good-dies (KGDs). In this embodiment, the SSVT transmitter is not integrated within the GPU. Video data is received from storage, cameras, Internet, etc., 828 and is processed by GPU 824 before being converted and encoded into an SSVT signal 830 by SSVT transmitter 826. This signal is then transported over any suitable EM pathway (physical wires, radio frequency or fiber-optic cable) to a display unit 839 where the signal is delivered to each of source drivers 832-838 and then decoded and displayed on a display panel as explained above. The display unit may include any large format, high dynamic range, high frame rate, high resolution display such as those described above. This higher-level integration embodiment uses 50% less power compared to conventional techniques.

Figure 13:
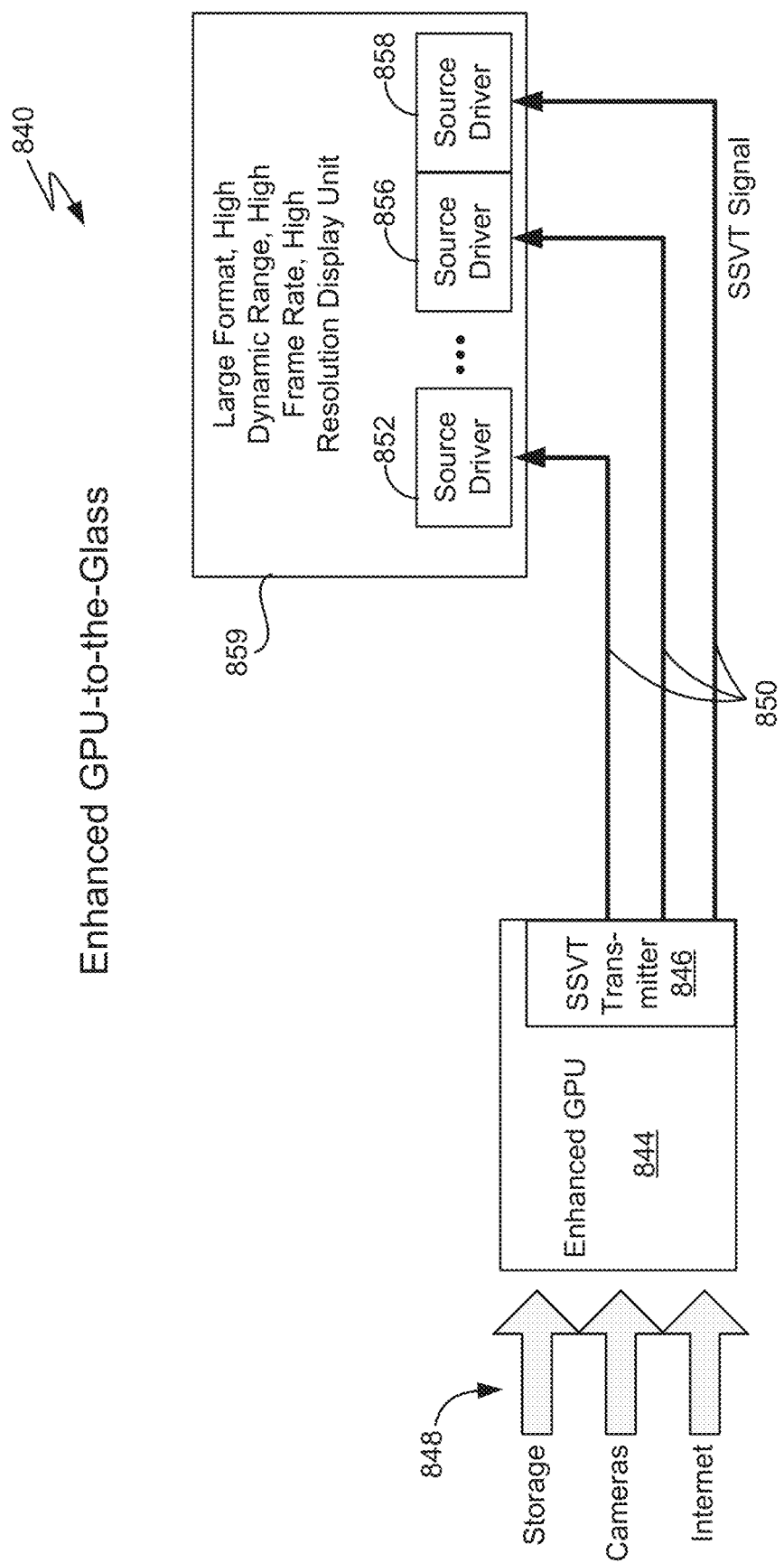
FIG. 13 illustrates an enhanced GPU-to-the-glass system in which an enhanced GPU includes a fully integrated SSVT transmitter.

FIG. 13 illustrates an enhanced GPU-to-the-glass embodiment 840 in which an enhanced GPU 844 includes a fully integrated SSVT transmitter 846 within the GPU die. Video data is received from storage, cameras, Internet, etc., 848 and is processed by GPU 844 before being converted and encoded into an SSVT signal 850 by SSVT transmitter 846. This signal is then transported over any suitable EM pathway (physical wires, radio frequency or fiber-optic cable) to a display unit 859 where the signal is delivered to each of source drivers 852-858 and then decoded and displayed on a display panel as explained above. The display unit may include any large format, high dynamic range, high frame rate, high resolution display such as those described above. This highest-level integration embodiment uses 60% less power compared to conventional techniques. Further, the GPU has an SSVT transmitter integrated into the same piece of silicon. Thus, all digital transport is happening within a very short distance and, therefore, a high data rate on a single chip is not as important.

SSVT Signal, Encoding and Decoding

As mentioned earlier, various embodiments of the present invention disclose that an analog SSVT signal be used to transport video information within a display unit (or to a display unit) in order to dispense with the need for DACs within the source drivers, among other advantages. Described below are techniques for encoding and decoding of that signal.

For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals. The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

Figure 14:
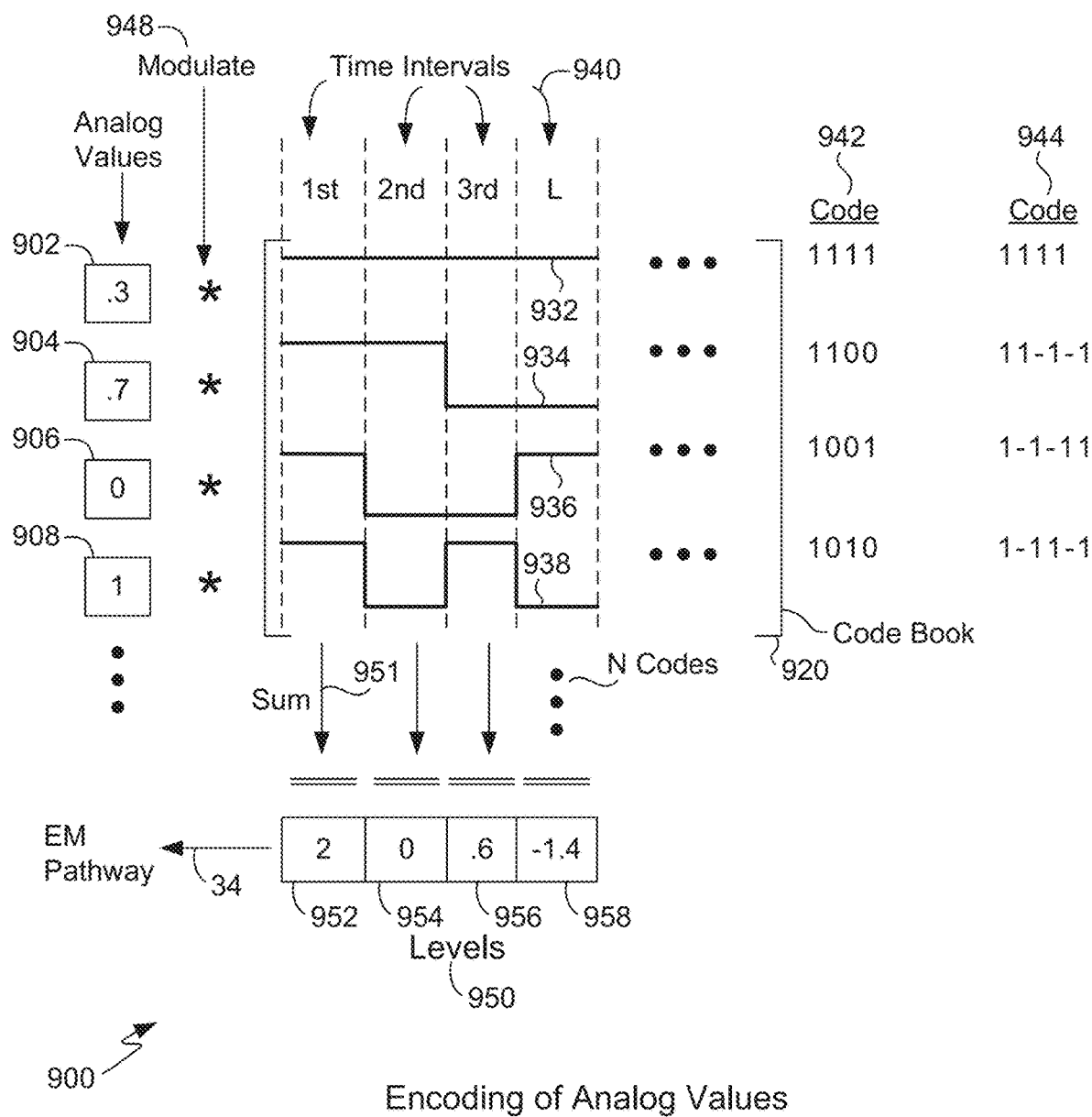
FIG. 14 illustrates an example showing how signal samples, in this case, analog values, are encoded within an encoder and then sent over an electromagnetic pathway.

FIG. 14 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent the luminance of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the starting signal sample voltages are usually higher than the encoded voltages in an SSVT signal. After encoding, the range of voltages is typically from 0 to 1 V for efficiency, although a different range is possible. Lower voltages mean less power consumed and may be used in the future.

These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

Figure 15:
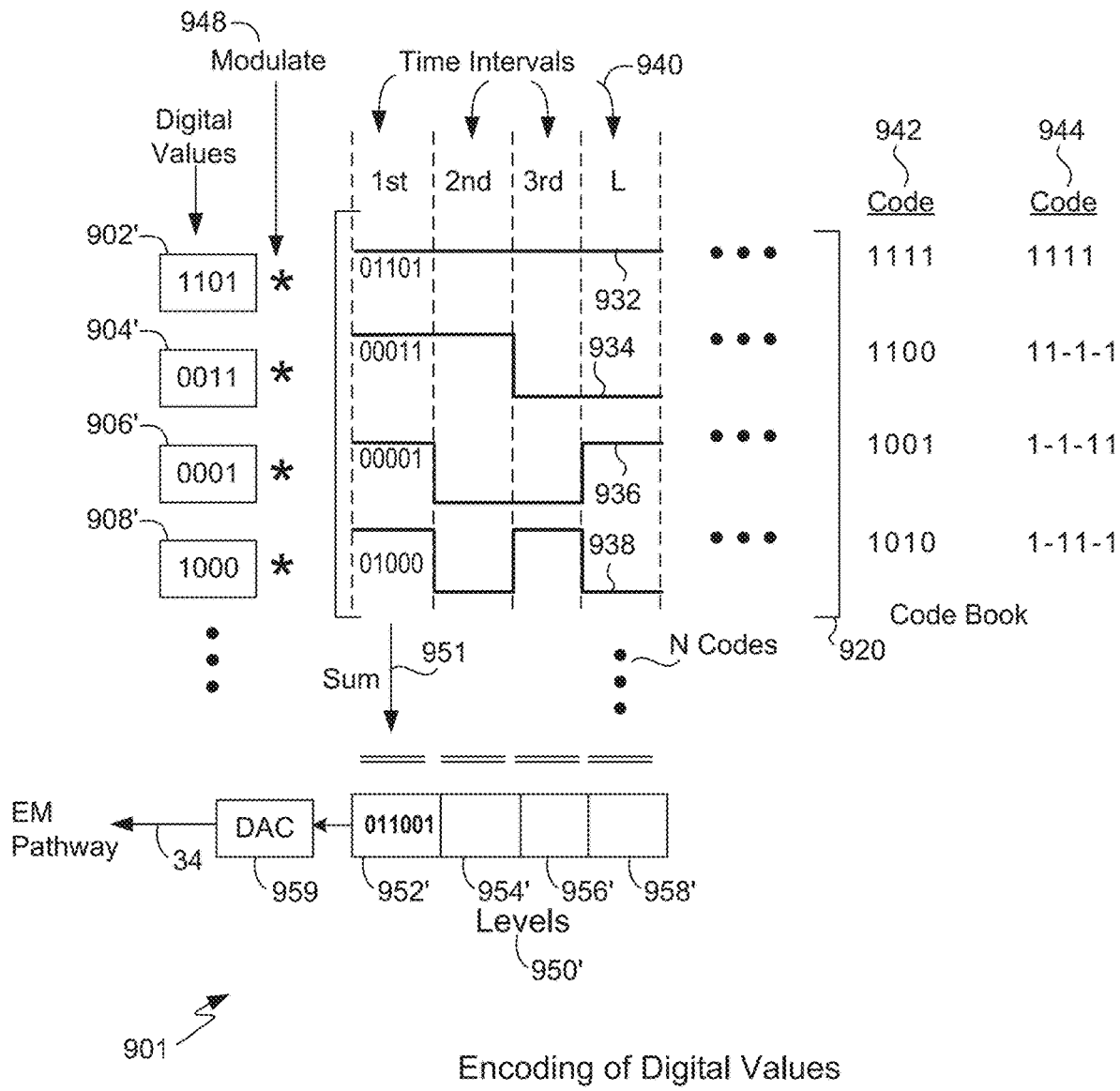
FIG. 15 illustrates a novel encoding technique as being applicable to signal samples that are digital values.

FIG. 15 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 16:
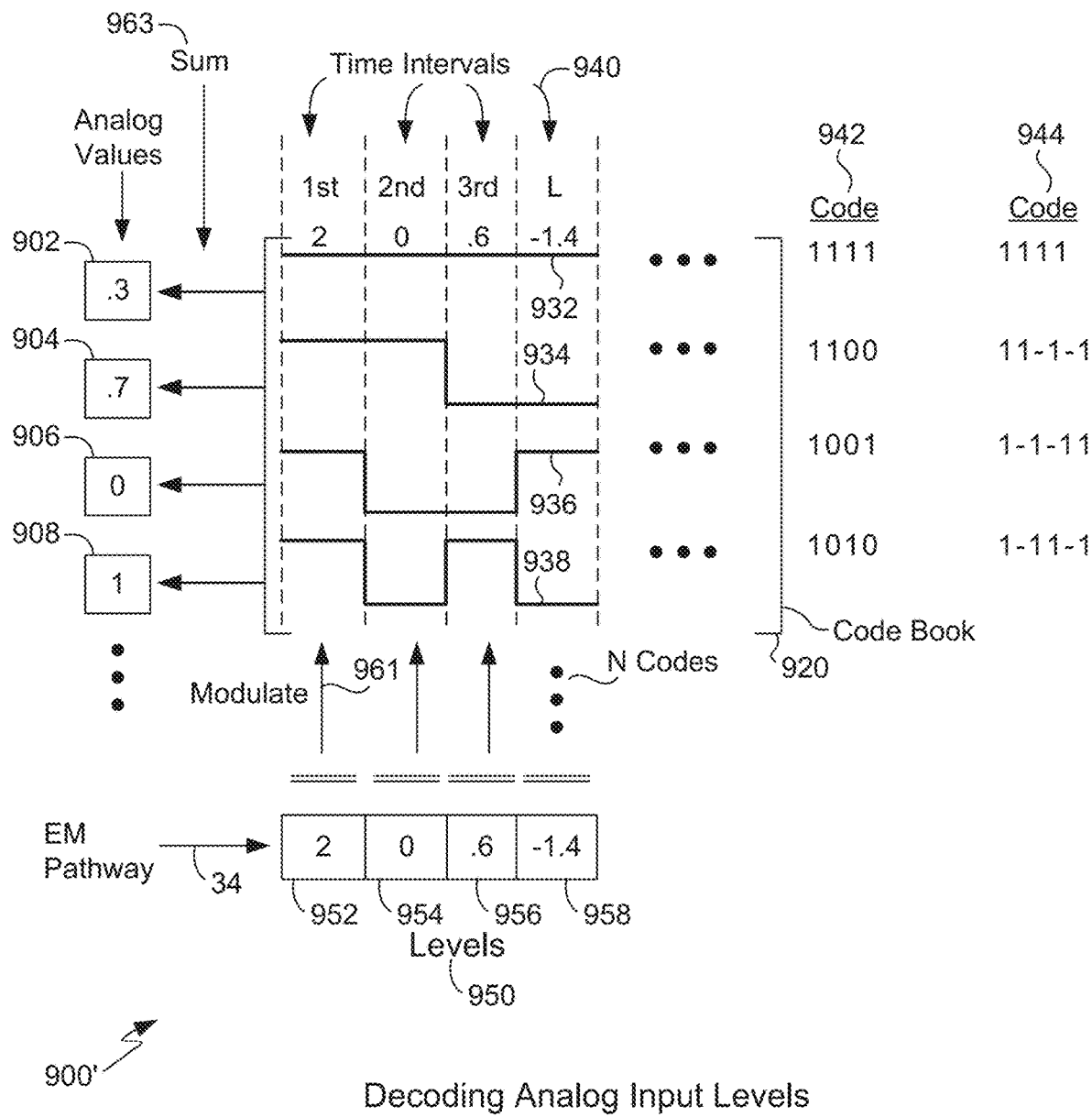
FIG. 16 illustrates decoding of analog input levels that were encoded using the encoder of FIG. 14.

FIG. 16 illustrates the decoding of analog input levels that were encoded using the encoder of FIG. 14. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, −1.4". Modulation of levels 952-958 by the second code 934 produces the series of modulated values "2, 0, −0.6, 1.4". Modulation by the third code 936 produces "2, 0, −0.6, −1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4"). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 17A:
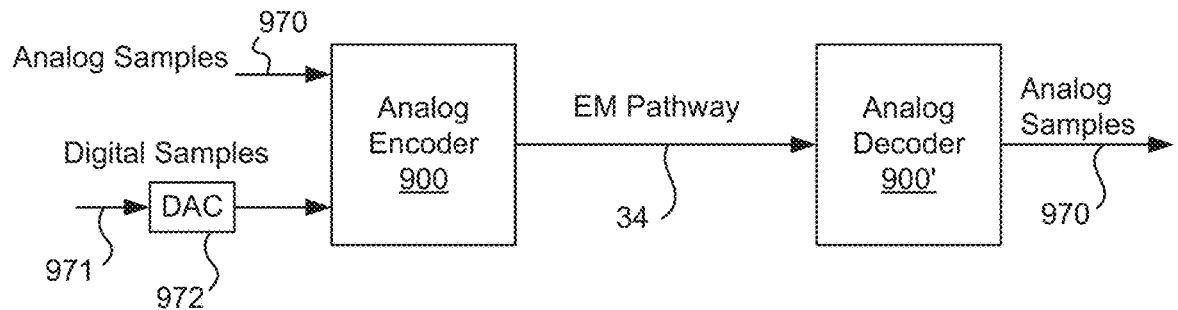
FIG. 17A illustrates use of an analog encoder and a corresponding analog decoder.
Figure 17B:
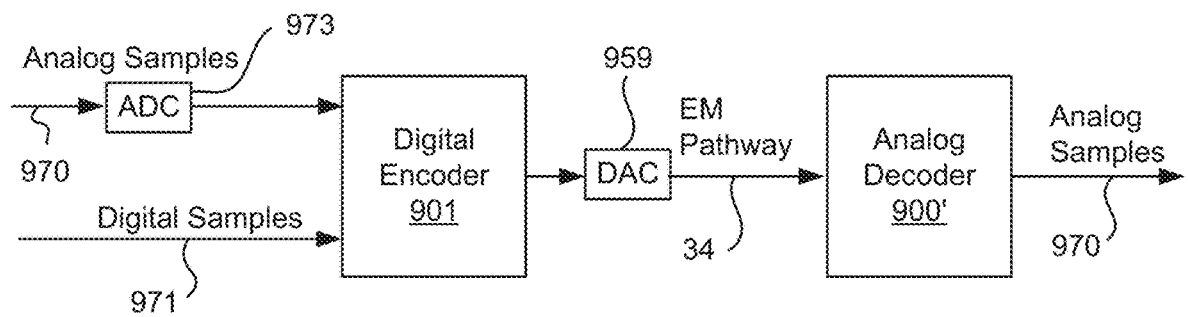
FIG. 17B illustrates use of a digital encoder and a corresponding analog decoder
Figure 17C:
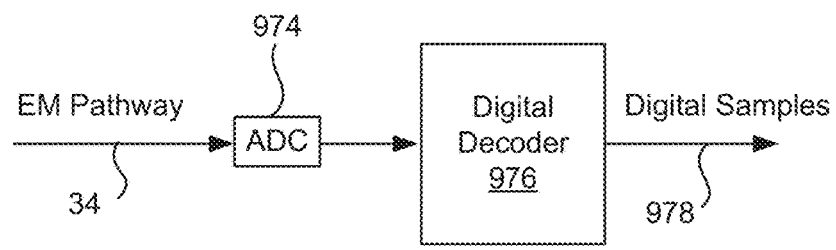
FIG. 17C illustrates use of a digital decoder to decode encoded analog signals that have arrived over an electromagnetic pathway.

FIGS. 17A, 17B and 17C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 17A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 17B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 17C illustrates use of a digital decoder to decode encoded analog signals that have arrived over an electromagnetic pathway on transmission medium 34. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Figure 18:
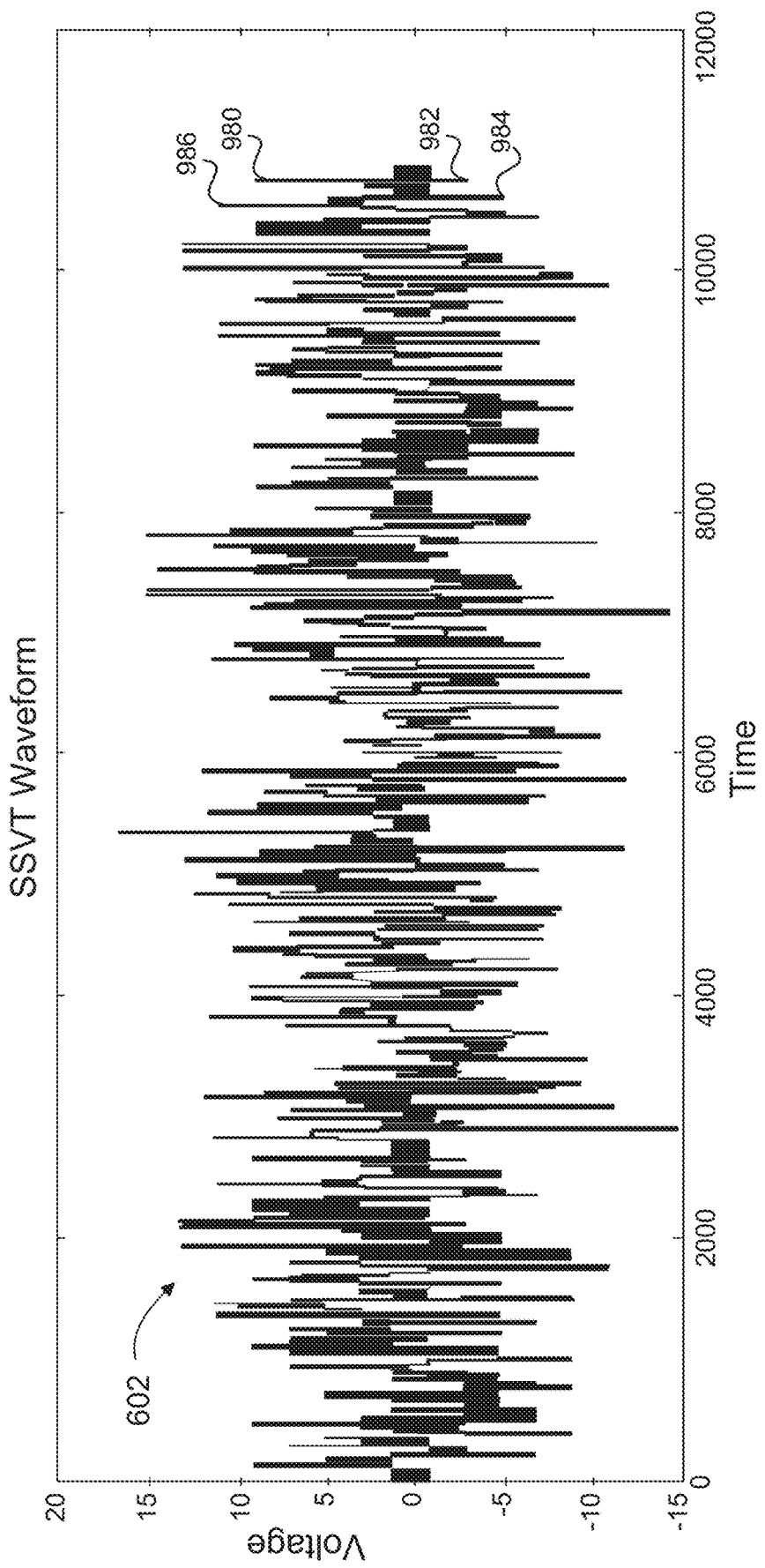
FIG. 18 shows a simulation of an SSVT waveform sent via an electromagnetic pathway.

FIG. 18 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art.

Decoder Detailed Embodiment

Figure 19:
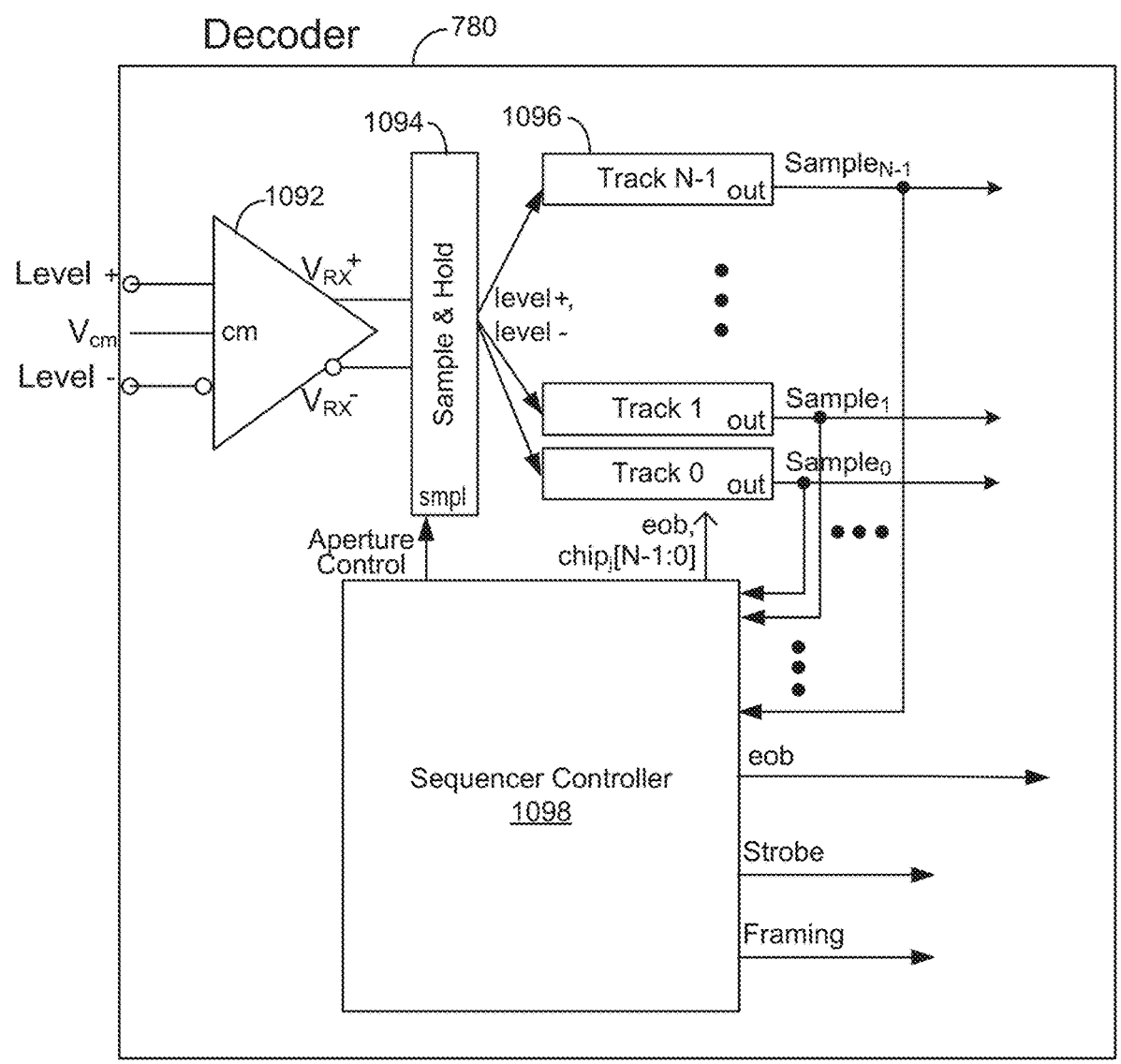
FIG. 19 is a logic diagram for one of the four decoders.

FIG. 19 is a logic diagram for one of the four decoders 780. The decoder 780 includes differential amplifier 1092 and sample and hold circuit 1094 arranged to receive, sample and hold one of the four differential EM level signals received over the transmission medium. Other types of circuits (receivers) arranged to receive, sample and hold an input EM level signal may also be used. The sampled EM level signals are then provided to each of N decoder track circuits 1096 ($N_{n-1}$ through $N_0$). A sequencer controller 1098 provides the same SSDS chip to each of N decoder track circuits 1096 that was applied on the transmit side respectively. As a result, the sample outputs ($N_{n-1}$ through $N_0$) are provided to the reconstruction bank 782. As the same SSDS chip that was used on the transmit side is used by each of the decoder track circuits 1096 the demodulated sample $N_{n-1}$ through $N_0$ is the same as prior to modulation on the transmit side.

The controller 1098 of each of the decoders 780 also generates a number of control signals, including a strobe signal, an end-of-bank (EOB) signal, an aperture signal and a framing signal. The EOB signal is provided to the reconstruction bank 782 and signifies the timing for when the staging bank 786 is completely full with samples. When this occurs, the EOB signal is asserted, clearing both the decoder tracks 1096 and the staging bank 786 in anticipation of a next set of reconstructed samples ($N_{n-1}$ through $N_0$). The aperture control signal is provided to the sample and hold circuit 1094, and the framing signal is provided to the channel aligner 787 and also to the staging controller 789.

Figure 20:
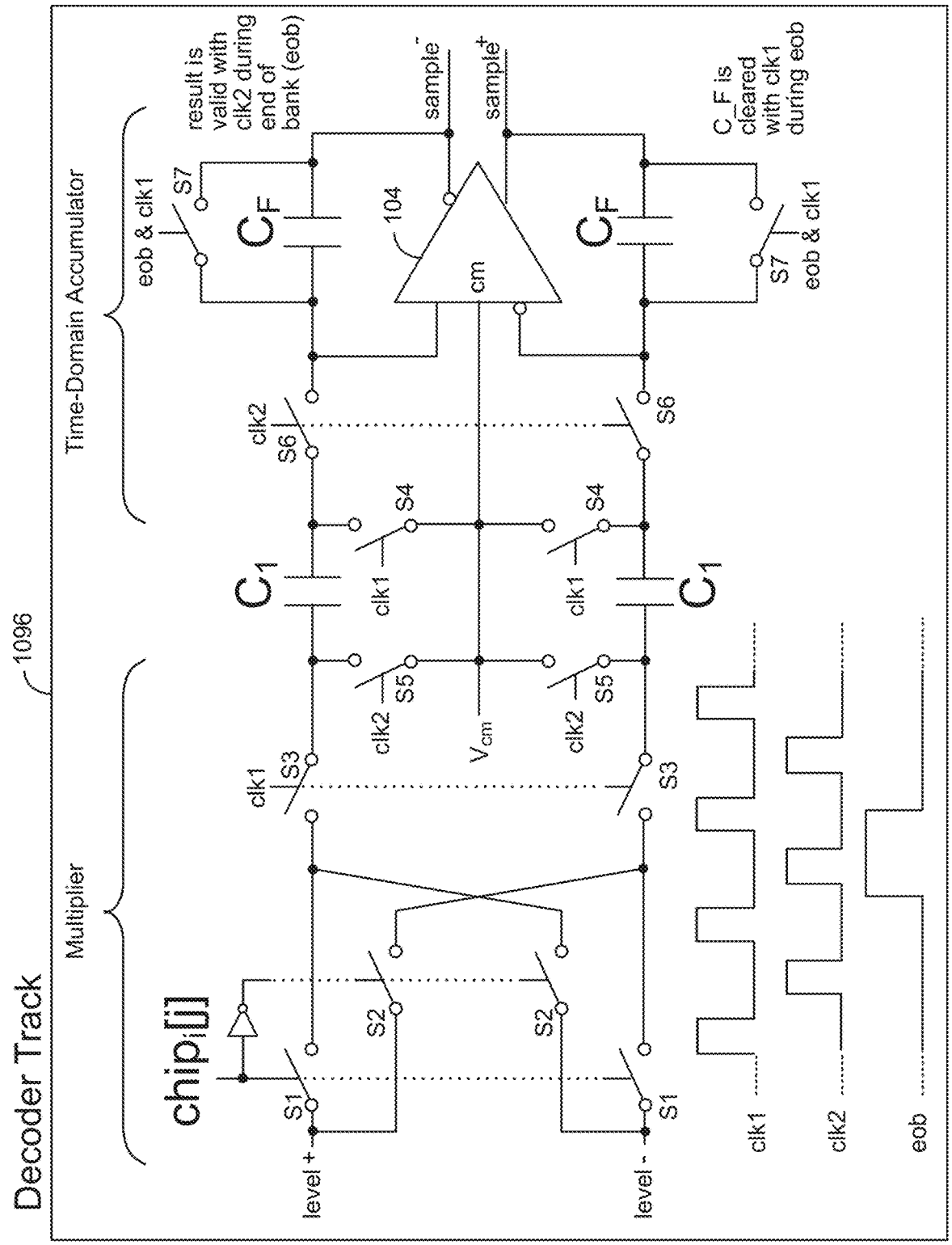
FIG. 20 is a diagram of a representative decoder track circuit as illustrated.

Referring to FIG. 20, a diagram of a representative decoder track circuit 1096 as illustrated. The decoder track circuit 1096 includes a multiplier portion and an accumulator portion. The multiplier portion includes a first pair of switches S1-S1, a second pair of switches S2-S2, a third pair of switches S3-S3 and a pair of capacitors C1-C1 on first (positive) and second (negative) power rails respectively. The accumulator portion includes additional pairs of transistors S4-S4, S5-S5, S6-S6 and S7-S7, an operational amplifier, and a pair of capacitors $C_F$ and $C_F$ on the first (positive) and second (negative) power rails respectively.

For each demodulation cycle, a differential EM level signal pair is received at the first level input (level +) terminal and a second level input (level −) terminal. The differential EM level signal pair is demodulated in the multiplier portion by conditionally inverting by multiplying by either positive (1) or negative (−1), depending on the value of the received SSDS chip.

If the SSDS chip has a value of (+1), then transistor pairs S1-S1 and S3-S3 close, while S2-S2 remain open, when clk 1 is active. As a result, the voltage values at the first level input (level +) terminal and the second level input (level −) are passed onto and stored by the two capacitors C1 and C1 on the positive and negative rails respectively. In other words, the input values are multiplied by (+1) and no inversion takes place.

If the SSDS chip has a value of −1, then the S1-S1 switches are both off, while the switches S2-S2 and S3-S3 are all turned on when clk 1 is active. As a result, the voltage values received at the positive or first (+) terminal and the negative or second (−) terminal are swapped. In other words, the input voltage value provided at the first or positive terminal is directed to and stored on the capacitor C1 on the lower negative rail, while the voltage value provided on the second or (−) terminal is switched to and stored on the capacitor C1 on the positive upper rail. The received voltage values at the input terminals are thereby inverted or multiplied by (−1).

When clk 1 transitions to inactive, the accumulated charge on C1 and C1 remain. When clk 2 transitions to active, then transistor pairs S4-S4 open while transistor pairs S5-S5 and S6-S6 close. The accumulated charge on the capacitors C1 on the upper or positive rail and C1 on the lower or negative rail are then provided to the differential inputs of the operational amplifier. The output of the operational amplifier is the original +/− sample pair prior to encoding on the transmit side.

The accumulated charge on the two capacitors C1 and C1 are also passed on to the capacitors CF and CF on the upper or positive rail and the lower or negative rail when Clk 2 is active. With each demodulation cycle, the charges on the capacitors C1 and C1 on the upper and lower rails are accumulated onto the two capacitors CF and CF on the upper and lower rails, respectively. When clk 1 and the EOB signal are both active, then the transistor pair S7-S7 are both closed, shorting the plates of each of the capacitors CF and CF. As a result, the accumulated charge is removed, and the two capacitors CF and CF are reset and ready for the next demodulation cycle.

Since each decoder 780 has N decoder track circuits 1096, N decoded or original +/− sample pairs are re-created each demodulation cycle. These N +/− sample pairs are then provided to the reconstruction bank 782, and then to the staging bank 786. As a result, the original set of samples is re-created with its original color content information (e.g., S=3 for RGB).

The decoder track 1096 reconstructs incoming level samples over a succession of L cycles, demodulating each successive input level with the successive SSDS chips of that track's code. The results of each of the L demodulations is accumulated on the feedback capacitor CF. When EOB is asserted during clk1 corresponds to the first demodulation cycle of the decoding cycle, CF is cleared after EOB such that it can begin again accumulating from zero volts or some other reset voltage. In various non-exclusive embodiments, the value of L is a predetermined parameter. In general, the higher the parameter L the greater the SSDS process gains and the better the electrical resiliency of the transmission of the SSVT signals over the transmission medium. On the other hand, the higher the parameter L, the higher the required frequency for the application of the SSVT modulation, which may compromise the signal quality due to insertion losses caused by the transmission medium.

The above-described demodulation cycle is repeated over and over with each of the decoders. The net result is the recovery of the original time-ordered sets of samples, each with their original color content information (i.e., a set of S samples).

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A video display unit comprising:
    a display panel including a plurality of gate drivers and a plurality of source drivers;
    each of said source drivers arranged to receive ordered sequences, each of L analog levels, representing a video stream over a transmission medium, wherein each of said source drivers includes
    a decoder that decodes each of said sequences of L analog levels with reference to a predetermined code set of N mutually-orthogonal codes each of length L into an output vector of N analog samples, each of said N codes being associated with one of said analog samples, and wherein L>=N>=2,
    a buffer arranged to collect said output vectors of N analog samples each from said decoder and to output said output vectors of N analog samples each in parallel, and
    a plurality of amplifiers arranged to amplify said analog samples of said output vectors and to output each of said analog samples to a column of said display panel,
    whereby said video stream is displayed on said display panel of said display unit.

2. A video display unit as recited in claim 1 further comprising:
    a video signal transmitter that receives said video stream in a digital representation and encodes said video stream using modulation into said ordered sequences of analog levels for delivery to each of said source drivers.

3. A video display unit as recited in claim 2 wherein said video signal transmitter is implemented in an integrated circuit separate from a video processor.

4. A video display unit as recited in claim 2 wherein said video signal transmitter is implemented as a system on module in conjunction with a video processor.

5. A video display unit as recited in claim 2 wherein said video signal transmitter is integrated within a video processor.

6. A video display unit as recited claim 1 further comprising:
    an input port that receives said ordered sequences of analog levels from an external display controller.

7. A video display unit as recited in claim 1 wherein each of said source drivers does not include a digital-to-analog converter for purposes of converting digital pixel data to analog pixel data.

8. A video display unit as recited in claim 1 including a plurality of decoders, the number decoders equal to the number of electromagnetic pathways used to transmit said analog levels over said transmission medium to said source drivers.

9. A video display unit as recited in claim 1 wherein at least one of said source drivers is arranged to extract a gate driver control signal from said analog levels and to output said gate driver control signal to said plurality of gate drivers in order to synchronize said gate drivers with outputs of said each source driver.

10. A source driver comprising:
    a receiver arranged to receive a plurality of ordered series of L analog input values from an electromagnetic pathway;
    a decoder that decodes each of said series of L analog input values with reference to a predetermined code set of N mutually-orthogonal codes each of length L into an output vector of N analog samples, each of said N codes being associated with one of said analog samples, and wherein L>=N>=2;
    a buffer arranged to collect said output vectors of N analog samples each from said decoder, and to output said output vectors of N analog samples each in parallel; and
    a plurality of amplifiers arranged to amplify said analog samples of said output vectors and to output each of said analog samples to a column of a display panel.

11. A source driver as recited in claim 10 wherein said predetermined code set is the same as a code set used to encode said ordered series of L analog input values.

12. A source driver as recited in claim 10 wherein said plurality of ordered series of L analog input values are received from a transmitter within a display unit that includes said display panel.

13. A source driver as recited in claim 10 wherein said plurality of ordered series of L analog input values are received from a transmitter external to a display unit that includes said display panel.

14. A source driver as recited in claim 10 wherein said source driver does not include a digital-to-analog converter (DAC) for purposes of converting digital pixel data to analog pixel data.

15. A source driver as recited in claim 10 wherein said display panel includes C columns, wherein said ordered series of L analog input values are received serially at a frequency freq(SSVT), wherein each of said output vectors of N analog samples are output from said decoder at a frequency freq(sample)=freq(SSVT)/N, and wherein said buffer outputs said output vectors of N analog samples in parallel at a frequency freq(line)=freq(sample)×N/C.

16. A source driver as recited in claim 10 wherein each of said N codes is indexed, said source driver further comprising:
- a set of N two-input correlators, each correlator associated with one of N locations of said output vector, each correlator having as one input a value in the ordered series of L input values and as the other input a corresponding value in the code associated with said one of N locations; and
- a set of N two-input summing circuits, each summing circuit associated with said one of N locations, each two-input summing circuit having as one input the output of the corresponding two-input correlator and as the other input the content of the corresponding output vector location.

17. A source driver as recited in claim 10 wherein said ordered series of L analog input values are received serially at said receiver, and wherein said each output vector of N analog samples is output in parallel from said decoder.

18. A source driver comprising:
- a receiver arranged to receive a plurality of ordered series of L analog input values from an electromagnetic pathway;
- a decoder that decodes each of said series of L analog input values with reference to a predetermined code set of N mutually-orthogonal codes each of length L into an output vector of N analog samples, each of said N codes being associated with one of said analog samples, and wherein L>=N>=2;
- a plurality of amplifiers arranged to amplify said analog samples of each of said output vectors and to output each of said output vectors; and
- a buffer arranged to collect said output vectors of N analog samples each from said amplifiers, and to output each of said analog samples in parallel to a column of a display panel.

19. A source driver as recited in claim 18 wherein said predetermined code set is the same as a code set used to encode said ordered series of L analog input values.

20. A source driver as recited in claim 18 wherein said plurality of ordered series of L analog input values are received from a transmitter within a display unit that includes said display panel.

21. A source driver as recited in claim 18 wherein said plurality of ordered series of L analog input values are received from a transmitter external to a display unit that includes said display panel.

22. A source driver as recited in claim 18 wherein said source driver does not include a digital-to-analog converter (DAC) for purposes of converting digital pixel data to analog pixel data.

23. A source driver as recited in claim 18 wherein said display panel includes C columns, wherein said ordered series of L analog input values are received serially at a frequency freq(SSVT), wherein each of said output vectors of N analog samples are output from said decoder at a frequency freq(sample)=freq(SSVT)/N, and wherein said buffer outputs said output vectors of N analog samples in parallel at a frequency freq(line)=freq(sample)×N/C.

24. A source driver as recited in claim 18 wherein each of said N codes is indexed, said source driver further comprising:
- a set of N two-input correlators, each correlator associated with one of N locations of said output vector, each correlator having as one input a value in the ordered series of L input values and as the other input a corresponding value in the code associated with said one of N locations; and
- a set of N two-input summing circuits, each summing circuit associated with said one of N locations, each two-input summing circuit having as one input the output of the corresponding two-input correlator and as the other input the content of the corresponding output vector location.

25. A source driver as recited in claim 18 wherein said ordered series of L analog input values are received serially at said receiver, and wherein said each output vector of N analog samples is output in parallel from said decoder.

26. A video display unit comprising:
- a display panel including a plurality of gate drivers and a plurality of source drivers;
- a video signal transmitter that receives a video stream in a digital representation and encodes said video stream using modulation into a plurality of ordered sequences of analog levels for delivery of each ordered sequence to one of said source drivers; and
- each of said source drivers arranged to receive one of said ordered sequences of analog levels over a transmission medium, said ordered sequences representing said video stream, and to decode said analog levels using demodulation to produce a plurality of analog samples for output on outputs of said each source driver, whereby said video stream is displayed on said display panel of said display unit.

27. A video display unit as recited in claim 26 wherein said ordered sequences of analog levels are discrete-time, continuous-amplitude analog samples.

28. A video display unit as recited in claim 26 wherein each of said source drivers does not include a digital-to-analog converter for purposes of converting digital pixel data to analog pixel data.

29. A video display unit as recited in claim 26 further comprising:
- a decoder in each source driver, the number of decoders equal to the number of electromagnetic pathways used to transmit said analog levels over said transmission medium to said source drivers.

30. A video display unit as recited in claim 26 wherein said video signal transmitter is implemented in an integrated circuit separate from a video processor.

31. A video display unit as recited in claim 26 wherein said video signal transmitter is implemented as a system on module in conjunction with a video processor.

32. A video display unit as recited in claim 26 wherein said video signal transmitter is integrated within a video processor.

33. A video display unit as recited in claim 26 wherein said ordered sequences of analog levels are received serially at said each source driver, and wherein said analog samples of said each source driver are output in parallel from said each source driver.

* * * * *